(12) United States Patent
Shelhamer et al.

(10) Patent No.: US 11,763,545 B2
(45) Date of Patent: Sep. 19, 2023

(54) GENERATING CONFIDENCE-ADAPTIVE PIXEL-LEVEL PREDICTIONS UTILIZING A MULTI-EXIT PIXEL-LEVEL PREDICTION NEURAL NETWORK

(71) Applicant: Adobe Inc., San Jose, CA (US)

(72) Inventors: Evan Shelhamer, London (GB); Zhuang Liu, Philadelphia, PA (US)

(73) Assignee: Adobe Inc., San Jose, CA (US)

( * ) Notice: Subject to any disclaimer, the term of this patent is extended or adjusted under 35 U.S.C. 154(b) by 284 days.

(21) Appl. No.: 17/214,365

(22) Filed: Mar. 26, 2021

(65) Prior Publication Data

US 2022/0309285 A1 Sep. 29, 2022

(51) Int. Cl.
| | | |
|---|---|---|
| *G06V 10/75* | (2022.01) | |
| *G06T 3/40* | (2006.01) | |
| *G06V 10/44* | (2022.01) | |
| *G06F 18/213* | (2023.01) | |
| *G06F 18/2411* | (2023.01) | |
| *G06N 3/045* | (2023.01) | |

(52) U.S. Cl.
CPC .......... *G06V 10/751* (2022.01); *G06F 18/213* (2023.01); *G06F 18/2411* (2023.01); *G06N 3/045* (2023.01); *G06T 3/4007* (2013.01); *G06T 3/4053* (2013.01); *G06V 10/44* (2022.01)

(58) Field of Classification Search
USPC ................................................ 382/159, 224
See application file for complete search history.

(56) References Cited

U.S. PATENT DOCUMENTS

| | | | | |
|---|---|---|---|---|
| 2020/0349697 A1* | 11/2020 | Gao | ........................ | G06F 18/24 |
| 2021/0056357 A1* | 2/2021 | Zhang | ..................... | G06N 3/084 |
| 2022/0122299 A1* | 4/2022 | Levinshtein | .............. | G06T 7/12 |
| 2022/0230282 A1* | 7/2022 | Zhang | ................... | G06V 10/809 |
| 2023/0127001 A1* | 4/2023 | Das | ........................ | G06V 10/82 |
| | | | | 706/15 |

(Continued)

OTHER PUBLICATIONS

Chun, Sehyun, et al. "NADS-Net: a nimble architecture for driver and seat belt detection via convolutional neural networks." Proceedings of the IEEE/CVF International Conference on Computer Vision Workshops. 2019. (Year: 2019).*

(Continued)

*Primary Examiner* — Ishrat I Sherali
(74) *Attorney, Agent, or Firm* — Keller Preece PLLC

(57) ABSTRACT

The present disclosure relates to systems, methods, and non-transitory computer readable media for efficiently, quickly, and flexibly generating and providing pixel-wise classification predictions utilizing early exit heads of a multi-exit pixel-level prediction neural network. For example, the disclosed systems utilize a multi-exit pixel-level prediction neural network to generate classification predictions for a digital image on the pixel level. The multi-exit pixel-level prediction neural network includes a specialized architecture with early exit heads having unique encoder-decoder architectures for generating pixel-wise classification predictions at different early exit stages. In some embodiments, the disclosed systems implement a spatial confidence-adaptive scheme to mask certain predicted pixels to prevent further processing of the masked pixels and thereby reduce computation.

20 Claims, 10 Drawing Sheets

(56) References Cited

U.S. PATENT DOCUMENTS

2023/0128637 A1* 4/2023 Kouris ............... G06V 20/70
382/173

OTHER PUBLICATIONS

Code for deep high-resolution representation learning for human pose estimation. https://github.com/ leoxiaobin/deep-high-resolution-net. pytorch, 2019.
Code for deep high-resolution representation learning for visual recognition. https://github.com/HRNet/ HRNet-Semantic-Segmentation, 2019.
Manuel Amthor, Erik Rodner, and Joachim Denzler. Impatient dnns-deep neural networks with dynamic time budgets. arXiv preprint arXiv:1610.02850, 2016.
M. Andriluka, L. Pishchulin, P. Gehler and B. Schiele, "2D Human Pose Estimation: New Benchmark and State of the Art Analysis," 2014 IEEE Conference on Computer Vision and Pattern Recognition, 2014, pp. 3686-3693, doi: 10.1109/CVPR.2014.471.
Shaojie Bai, Vladlen Koltun, and J Zico Kolter. Multiscale deep equilibrium models. arXiv preprint arXiv:2006.08656, 2020.
Shijie Cao, Lingxiao Ma, Wencong Xiao, Chen Zhang, Yunxin Liu, Lintao Zhang, Lanshun Nie, and Zhi Yang. Seer-net: Predicting convolutional neural network feature-map sparsity through low-bit quantization. In Proceedings of the IEEE Conference on Computer Vision and Pattern Recognition, pp. 11216-11225, 2019.
Sharan Chetlur, Cliff Woolley, Philippe Vandermersch, Jonathan Cohen, John Tran, Bryan Catanzaro, and Evan Shelhamer. cuDNN: Efficient primitives for deep learning. arXiv preprint arXiv:1410.0759, 2014.
Christopher Choy, JunYoung Gwak, and Silvio Savarese. 4d spatio-temporal convnets: Minkowski convolutional neural networks. In Proceedings of the IEEE Conference on Computer Vision and Pattern Recognition, pp. 3075-3084, 2019.
Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pp. 3213-3223, 2016.
Thomas L Dean and Mark S Boddy. "An analysis of time-dependent planning"; Department of Computer Science; Brown University; From: AAAI-88 Proceedings. Copyright © 1988, AAAI (www.aaai.org).
Xuanyi Dong, Junshi Huang, Yi Yang, and Shuicheng Yan. More is less: a more complicated network with less inference complexity. In Proceedings of the IEEE Conference on Computer Vision and Pattern Recognition, pp. 5840-5848, 2017.
Michael Figurnov, Maxwell D Collins, Yukun Zhu, Li Zhang, Jonathan Huang, Dmitry Vetrov, and Ruslan Salakhutdinov. Spatially adaptive computation time for residual networks. In Proceedings of the IEEE Conference on Computer Vision and Pattern Recognition, pp. 1039-1048, 2017.
Bjorn Frohlich, Erik Rodner, and Joachim Denzler. As time goes by—anytime semantic segmentation with iterative context forests. In Joint DAGM (German Association for Pattern Recognition) and OAGM Symposium, pp. 1-10. Springer, 2012.
Benjamin Graham and Laurens van der Maaten. Sub-manifold sparse convolutional networks. arXiv preprint arXiv:1706.01307, 2017.
Alex Grubb and Drew Bagnell. Speedboost: Anytime prediction with uniform near-optimality. InArtificial Intelligence and Statistics, pp. 458-466, 2012.
Song Han, Jeff Pool, John Tran, and William Dally. Learning both weights and connections for efficient neural network. In Advances in neural information processing systems, pp. 1135-1143, 2015.
Kaiming He, Xiangyu Zhang, Shaoqing Ren, and Jian Sun. Deep residual learning for image Yecognition. In Proceedings of the IEEE conference on computer vision and pattern recognition, pp. 770-778, 2016.

Geoffrey Hinton, Oriol Vinyals, and Jeff Dean. Distilling the knowledge in a neural network.arXiv preprint arXiv:1503.02531, 2015.
Eric J Horvitz, Jaap Suermondt, and Gregory F Cooper. Bounded conditioning: Flexible inference for decisions under scarce resources. arXiv preprint arXiv:1304.1512, 2013.
Hanzhang Hu, Debadeepta Dey, Martial Hebert, and J Andrew Bagnell. Learning anytime predictions in neural networks via adaptive loss balancing. In Proceedings of the AAAI Conference on Artificial Intelligence, vol. 33, pp. 3812-3821, 2019.
Gao Huang, Danlu Chen, Tianhong Li, Felix Wu, Laurens van der Maaten, and Kilian Q Weinberger. Multi-scale dense networks for resource efficient image classification.arXiv preprint arXiv:1703.09844, 2017.
Benoit Jacob, Skirmantas Kligys, Bo Chen, Menglong Zhu, Matthew Tang, Andrew Howard, Hartwig Adam, and Dmitry Kalenichenko. Quantization and training of neural networks for efficient integer-arithmetic-only inference. InProceedings of the IEEE Conference on Computer Vision and Pattern Recognition, pp. 2704-2713, 2018.
Sergey Karayev, Mario Fritz, and Trevor Darrell. Anytime recognition of objects and scenes. In Proceedings of the ieee conference on computer vision and pattern recognition, pp. 572-579, 2014.
Alex Krizhevsky, Ilya Sutskever, and Geoffrey E Hinton. Imagenet classification with deep convolutional neural networks. Communications of the ACM, 60(6):84-90, 2017.
Hao Li, Asim Kadav, Igor Durdanovic, Hanan Samet, and Hans Peter Graf. Pruning filters for efficient convnets.arXiv preprint arXiv:1608.08710, 2016.
Ji Lin, Yongming Rao, Jiwen Lu, and Jie Zhou. Runtime neural pruning. In Advances in neural information processing systems, pp. 2181-2191, 2017.
Yingyan Lin, Charbel Sakr, Yongjune Kim, and Naresh Shanbhag. Predictivenet: an energyefficient convolutional neural network via zero prediction. In2017 IEEE international symposium on circuits and systems (ISCAS), pp. 1-4. IEEE, 2017.
Buyu Liu and Xuming He. Learning dynamic hierarchical models for anytime scene labeling. In European Conference on Computer Vision, pp. 650-666. Springer, 2016.
Lanlan Liu and Jia Deng. Dynamic deep neural networks: Optimizing accuracy-efficiency trade-offs by selective execution. arXiv preprint arXiv:1701.00299, 2017.
Zhuang Liu, Mingjie Sun, Tinghui Zhou, Gao Huang, and Trevor Darrell. Rethinking the value of network pruning. arXiv preprint arXiv:1810.05270, 2018.
Jonathan Long, Evan Shelhamer, and Trevor Darrell. Fully convolutional networks for semantic segmentation. In Proceedings of the IEEE conference on computer vision and pat-tern recognition, pp. 3431-3440, 2015.
Mason McGill and Pietro Perona. Deciding how to decide: Dynamic routing in artificial neural networks. arXiv preprint arXiv:1703.06217, 2017.
Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: an imperative style, high-performance deep learning library. In Advances in neural information processing systems, pp. 8026-8037, 2019.
Mohammad Rastegari, Vicente Ordonez, Joseph Redmon, and Ali Farhadi. Xnor-net: Imagenet classification using binary convolutional neural networks. In European conference on computer vision, pp. 525-542. Springer, 2016.
Mengye Ren, Andrei Pokrovsky, Bin Yang, and Raquel Urtasun. Sbnet: Sparse blocks network for fast inference. In Proceedings of the IEEE Conference on Computer Vision and Pattern Recognition, pp. 8711-8720, 2018.
Adriana Romero, Nicolas Ballas, Samira Ebrahimi Kahou, Antoine Chassang, Carlo Gatta, and Yoshua Bengio. Fitnets: Hints for thin deep nets. arXiv preprint arXiv:1412.6550, 2014.
Gil Shomron, Ron Banner, Moran Shkolnik, and Uri Weiser. Thanks for nothing: Predicting zero-valued activations with lightweight convolutional neural networks. arXiv preprint arXiv:1909.07636, 2019.
Ke Sun, Bin Xiao, Dong Liu, and Jingdong Wang. Deep high-resolution representation learning for human pose estimation. In

(56) References Cited

OTHER PUBLICATIONS

Proceedings of the IEEE conference on computer vision and pattern recognition, pp. 5693-5703, 2019.
Surat Teerapittayanon, Bradley McDanel, and Hsiang-Tsung Kung. Branchynet: Fast inference via early exiting from deep neural networks. In 2016 23rd International Conference on Pattern Recognition (ICPR), pp. 2464-2469. IEEE, 2016.
Andreas Veit and Serge Belongie. Convolutional networks with adaptive inference graphs. In Proceedings of the European Conference on Computer Vision (ECCV), pp. 3-18, 2018.
Susan V Vrbsky and Jane W-S Liu. An object-oriented query processor that produces monotonically improving approximate answers. In Proceedings. Seventh International Conference on Data Engineering, pp. 472-473. IEEE Computer Society, 1991.
Richard J Wallace and Eugene C Freuder. Anytime algorithms for constraint satisfaction and sat problems. ACM SIGART Bulletin, 7(2):7-10, 1996.
Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.
Xin Wang, Fisher Yu, Zi-Yi Dou, Trevor Darrell, and Joseph E Gonzalez. Skipnet: Learning dynamic Youting in convolutional networks. In Proceedings of the European Conference on Computer Vision (ECCV), pp. 409-424, 2018.
Yan Wang, Zihang Lai, Gao Huang, Brian H Wang, Laurens Van Der Maaten, Mark Campbell, and Kilian Q Weinberger. Anytime stereo image depth estimation on mobile devices. In 2019 International Conference on Robotics and Automation (ICRA), pp. 5893-5900. IEEE, 2019.
Yan Wang, Lequn Wang, Yurong You, Xu Zou, Vincent Chen, Serena Li, Gao Huang, Bharath Hariharan, and Kilian Q Weinberger. Resource aware person re-identification across multiple Yesolutions. In Proceedings of the IEEE Conference on Computer Vision and Pattern Recognition, pp. 8042-8051, 2018.
Henry M Wellman and David Liu. Scaling of theory-of-mind tasks.Child development, 75(2):523-541, 2004.
Zuxuan Wu, Tushar Nagarajan, Abhishek Kumar, Steven Rennie, L. Davis, K. Grauman, and R. Feris. Blockdrop: Dynamic inference paths in residual networks.2018 IEEE/CVF Conference on Computer Vision and Pattern Recognition, pp. 8817-8826, 2018.
Zhenda Xie, Zheng Zhang, Xizhou Zhu, Gao Huang, and Stephen Lin. Spatially adaptive inference with stochastic feature sampling and interpolation. arXiv preprint arXiv:2003.08866, 2020.
Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.
Shlomo Zilberstein. Using anytime algorithms in intelligent systems. AI magazine, 17(3):73-73, 1996.

\* cited by examiner

| | Method / Output | Accuracy (mIoU) | | | | | Computation (GFLOPs) | | | | |
|---|---|---|---|---|---|---|---|---|---|---|---|
| | | 1 | 2 | 3 | 4 | Avg | 1 | 2 | 3 | 4 | Avg |
| Baselines | Conventional Model | - | - | - | 80.7 | - | - | - | - | 696.2 | - |
| | MDEQ | 17.3 | 38.7 | 65.5 | 72.4 | 48.5 | 521.6 | 717.9 | 914.2 | 1110.5 | 816.0 |
| Pixel-Level Prediction System | Early Exiting | 34.3 | 59.0 | 76.9 | 80.4 | 62.7 | 48.4 | 113.4 | 388.9 | 722.2 | 318.2 |
| | Early Exiting + RH | 44.6 | 60.2 | 76.6 | 79.9 | 65.3 | 41.9 | 105.6 | 368.0 | 701.3 | 304.2 |
| | Early Exiting + RH + CA | 44.3 | 60.1 | 76.8 | 81.3 | 65.7 | 41.9 | 93.9 | 259.3 | 387.1 | 195.6 |

```
┌─────────────────────────────────────────────────────────────────┐
│ Extracting A First Set Of Features Utilizing A First Set Of Layers 902 │
└─────────────────────────────────────────────────────────────────┘
                                  │
                                  ▼
┌─────────────────────────────────────────────────────────────────┐
│        Generating A First Pixel-Wise Classification Prediction 904     │
└─────────────────────────────────────────────────────────────────┘
                                  │
                                  ▼
┌─────────────────────────────────────────────────────────────────┐
│ Extracting A Second Set Of Features Utilizing A Second Set Of Layers 906 │
└─────────────────────────────────────────────────────────────────┘
                                  │
                                  ▼
┌─────────────────────────────────────────────────────────────────┐
│       Generating A Second Pixel-Wise Classification Prediction 908     │
└─────────────────────────────────────────────────────────────────┘
```

*Fig. 9*

GENERATING CONFIDENCE-ADAPTIVE PIXEL-LEVEL PREDICTIONS UTILIZING A MULTI-EXIT PIXEL-LEVEL PREDICTION NEURAL NETWORK

BACKGROUND

In recent years, engineers and computer scientists have made significant advances in developing computer systems for recognizing and labeling digital images depicting objects. For example, some conventional image classification systems utilize deep convolutional neural networks to classify digital images based on recognizing one or more objects depicted within the images. However, deep convolutional neural networks are computationally expensive to train and implement. As a result, some conventional image classification systems attempt to tackle the efficiency problem of these neural networks by utilizing various techniques such as special-purpose libraries, compression by network pruning, quantization, and/or adjusting architecture by distillation. Despite these advances, however, many conventional image classification systems continue to demonstrate a number of deficiencies or drawbacks, particularly in efficiency, speed, and flexibility.

As suggested, many conventional image classification systems inefficiently generate predicted classifications for digital images. Particularly, conventional systems that utilize deep convolutional neural networks require excessive amounts of computing resources such as processing power and memory to train and implement the neural networks. Even conventional systems that attempt to reduce computational requirements with techniques such as special-purpose libraries, compression by network pruning, quantization, and/or adjusting architecture by distillation are inefficient. Indeed, while these solutions accelerate network computation, these systems still process digital information through voluminous neural network layers to generate an output prediction.

Due at list in part to their computational inefficiency, some conventional image classification systems are also slow in generating predictions. For instance, the computational burden of some conventional systems slows down their prediction time. As a result, in some cases, conventional systems that utilize deep convolutional neural networks are too cumbersome and slow for deployment in interactive applications for generating predictions in time-critical scenarios.

Beyond the foregoing inefficiencies, many conventional image classification systems are also inflexible. In particular, conventional systems are often not adaptable to time-sensitive or low-resource use cases. To elaborate, the computational requirements of conventional systems prevent their deployment on low power devices (e.g., mobile devices) and further prevent them from generating predictions in time-sensitive scenarios (e.g., where a prediction may be required before expiration of the computation time for an entire neural network). Even conventional systems that implement inference techniques at multiple junctures of a neural network are rigidly fixed to classification at the image level (e.g., classifying a digital image by its depicted object(s)).

Thus, there are several disadvantages with regard to conventional image classification systems.

SUMMARY

This disclosure describes one or more embodiments of systems, methods, and non-transitory computer readable media that solve one or more of the foregoing or other problems in the art with a single-model, multi-exit approach for pixel-level visual recognition. For example, the disclosed systems adopt an early exiting framework for a prediction neural network, where multiple predictors branch from intermediate stages of the model to provide anytime pixel-level recognition through a single model. In some cases, the disclosed systems train the multi-exit pixel-level prediction neural network using an end-to-end approach (e.g., for both an original exit and intermediate exits) to learn parameters for each early exit predictor head. At deployment, each early exit head generates a respective prediction at the pixel level to, for example, classify pixels as belonging to a particular category (e.g., for semantic segmentation or for pose estimation). For each early exit head, the disclosed systems can utilize a unique encoder-decoder structure that combines pooling, convolution, and interpolation to enlarge receptive fields, smooth spatial noise, and account for depth and spatial resolution of each model stage. Additionally, the disclosed systems can mask the output of each exit head utilizing confidence thresholding that reduces the remaining computation in future exits. Utilizing this confidence adaptivity approach can further improve efficiency and flexibility of generating predictions at various exit heads without sacrificing accuracy in generating pixel-level predictions.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 7 illustrates an example table of performance metrics comparing the pixel-level prediction system against conventional systems in accordance with one or more embodiments;

FIG. 9 illustrates a flowchart of a series of acts generating and providing pixel-wise classification predictions utilizing early exit heads of a multi-exit pixel-level prediction neural network in accordance with one or more embodiments.

DETAILED DESCRIPTION

Figure 1:
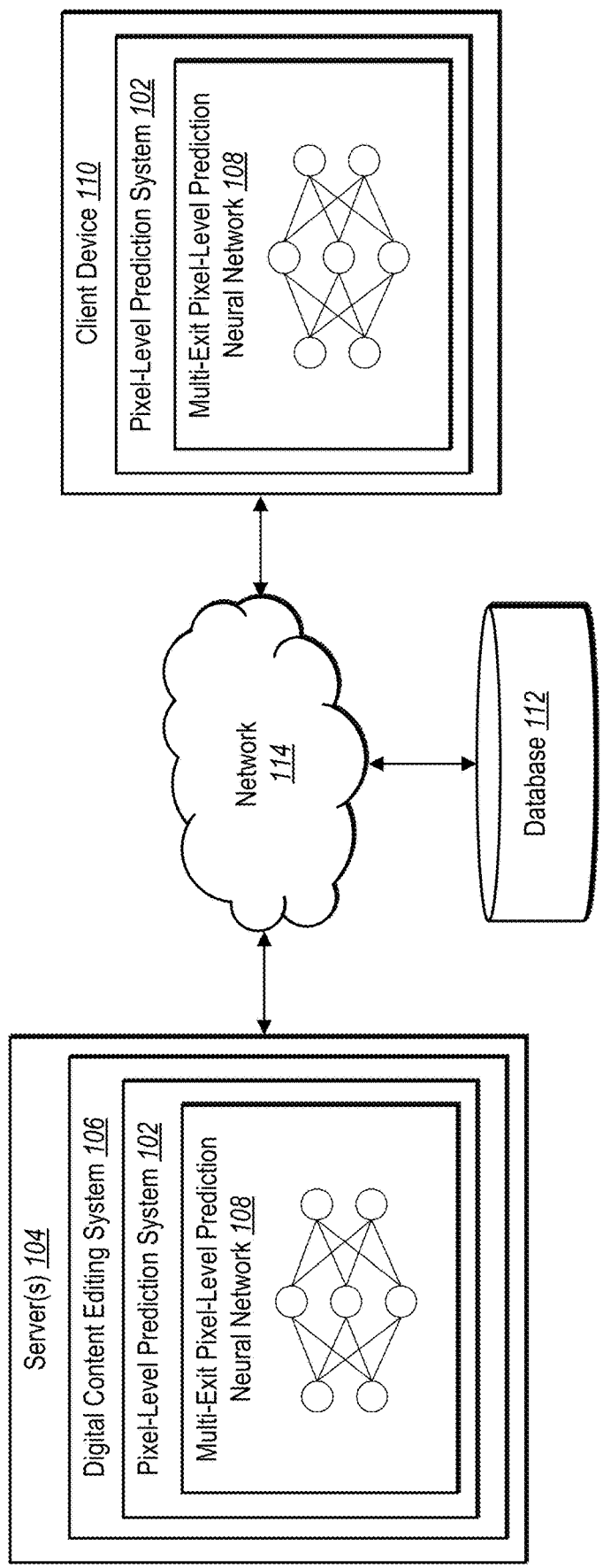
FIG. 1 illustrates an example system environment in which a pixel-level prediction system operates in accordance with one or more embodiments.

This disclosure describes one or more embodiments of a pixel-level prediction system that efficiently, quickly, and flexibly generates pixel-wise classification predictions at multiple early exit heads of a multi-exit pixel-level prediction neural network. In particular, the pixel-level prediction system utilizes a multi-exit pixel-level prediction neural network that includes a cascade of exit heads attached to the model to make multiple anytime predictions and direct further computations at subsequent layers of the model. In one or more embodiments, the multi-exit pixel-level prediction neural network accounts for depth and spatial resolution of each model stage by utilizing a unique encoder-decoder structure at each early exit head with a particular number of convolution layers for downsampling and upsampling extracted features to generate a prediction. To reduce total computation, and make full use of prior predictions, the pixel-level prediction system can further utilize a spatially adaptive approach to avoid further computation on regions where early predictions satisfy a confidence threshold. For instance, at later stages, the pixel-level prediction system only processes pixels (or features corresponding to pixels) with low-confidence predicted values from earlier stages, refraining from processing (at later stages) pixels having predicted values with high confidence (from earlier stages). Indeed, experimental results indicate that the pixel-level prediction system can generate accurate pixel-specific predictions utilizing an anytime, early-exit architecture that reduces operations by up to 59%, thus improving efficiency, speed, and flexibility relative to conventional systems.

As just mentioned, in one or more embodiments, the pixel-level prediction system utilizes a multi-exit pixel-level prediction neural network to generate pixel-wise classification predictions. For example, the multi-exit pixel-level prediction neural network includes a particular architecture for generating multiple pixel-wise classification predictions at respective early exit heads. In some cases, the multi-exit pixel-level prediction neural network includes a first early exit head that generates a first pixel-wise classification prediction from a first set of features extracted from a digital image by a first set of layers. In these or other cases, the multi-exit pixel-level prediction neural network also includes a second early exit head that generates a second pixel-wise classification prediction from a second set of features extracted from the digital image by a second set of layers. Further, in certain cases, the multi-exit pixel-level prediction neural network includes a final set of layers for generating a final pixel-wise classification prediction.

In addition to using multiple early exit heads, the pixel-level prediction system accounts for variations in spatial structure of digital images to generate accurate pixel-wise classification predictions. Indeed, some simple regions of a digital image may need less processing, while complex regions may need more analysis to obtain accurate predictions at the pixel level. To this end, the pixel-level prediction system uses a spatially adaptive scheme that decides which pixels to analyze or skip in computations at subsequent layers and/or for subsequent exit heads.

To elaborate, in some embodiments, the pixel-level prediction system saves computing cost by utilizing a confidence adaptivity approach to decide whether or not to continue computation at each exit and pixel position. For example, the pixel-level prediction system masks the output at each early exit head by thresholding the confidence of its predictions. The pixel-level prediction system then removes those pixels or features with sufficiently confident predicted values from further processing at subsequent exit heads. The remaining computation for sufficiently confident pixels (or corresponding features) is thus reduced. For each masked pixel (or masked feature(s)) within a pixel mask, the pixel-level prediction system will persist or carry through its prediction to subsequent exits. To avoid distortions and inaccuracies in future layers, in one or more embodiments, the pixel-level prediction system interpolates the features for the masked pixels to preserve contextual information surrounding unknown pixel locations.

To illustrate operation of the pixel-level prediction system by way of an example, the pixel-level prediction system extracts a first set of features from a digital image utilizing a first set of layers of a multi-exit pixel-level prediction neural network. In some embodiments, the pixel-level prediction system further applies a first early exit head to generate a first pixel-wise classification prediction that indicates predicted values for pixels of the digital image. To generate the first pixel-wise classification prediction, the pixel-level prediction system utilizes an encoder portion of the first early exit head to downsample the first set of features by a first downsample measure (e.g., to condense the extracted features into a lower-resolution feature map), thereby effectively increasing the area, or the receptive field, for each pixel from which to gather information.

Continuing the example, the pixel-level prediction system determines confidence scores associated with the predicted values for the pixels within the first pixel-wise classification prediction. For instance, the pixel-level prediction system determines measures of confidence that the predicted values are accurate representations of the pixels (or the features corresponding to the pixels) at each position. In some cases, the pixel-level prediction system further compares the confidence scores to a pixel mask confidence threshold. Based on the comparison, in some embodiments, the pixel-level prediction system utilizes a pixel mask to mask pixels (e.g., features corresponding to the pixels) that satisfy the pixel mask confidence threshold. Thus, the pixel-level prediction system generates a masked feature map by masking features whose predicted values satisfy the confidence threshold while or leaving unmasked those pixels/features that fail to satisfy the confidence threshold.

In these or other embodiments, the pixel-level prediction system treats masked features differently from unmasked features in subsequent layers of the multi-exit pixel-level prediction neural network. For instance, instead of re-convolving for all of the features again at a second set of layers of the multi-exit pixel-level prediction neural network, the pixel-level prediction system saves computation by convolving only unmasked features—those features corresponding to predicted values (or pixels) that fail to satisfy the pixel mask confidence threshold—to generate new predictions.

In some cases, the pixel-level prediction system preserves, from the first pixel-wise classification prediction (generated by the first early exit head), predicted values that satisfy the pixel mask confidence threshold, and interpolates these features instead of re-convolving them. Thus, the pixel-level prediction system generates an interpolated feature map from the masked feature map by interpolating masked features (and convolving unmasked features). In some embodiments, the pixel-level prediction system inputs the interpolated feature map into a second set of layers of the multi-exit pixel-level prediction neural network to extract a second set of features from the digital image (or from the interpolated feature map).

Further continuing the example, in certain embodiments, the pixel-level prediction system utilizes the second set of features extracted by the second set of layers to generate a second pixel-wise classification prediction. For example, the pixel-level prediction system utilizes a second early exit head to downsample the second set of features by a second downsample measure (less than the first downsample measure of the first early exit head) and to further generate predicted values corresponding to pixels of the digital image. In some cases, the second early exit head includes fewer convolutional layers than the first early exit head because less downsampling is necessary at later stages where receptive fields are effectively larger.

In some embodiments, the pixel-level prediction system repeats the process for each successive early exit head of the multi-exit pixel-level prediction neural network. Specifically, the pixel-level prediction system utilizes a set of layers to extract features (from an interpolated feature map of the previous stage), applies an early exit head to generate a pixel-wise classification prediction from the extracted features, generates a pixel mask by comparing predicted values within the pixel-wise classification prediction against a confidence threshold, and generates an interpolated feature map to pass on to the next set of layers in the succession. The pixel-level prediction system repeats the process through all early exit heads until generating a final pixel-wise classification prediction output from a final set of layers of the multi-exit pixel-level prediction neural network.

In some cases, the pixel-level prediction system receives an indication to generate a pixel-wise classification prediction. For instance, the pixel-level prediction system receives user interaction via an image editing interface to determine semantic segmentations for a digital image. Similarly, the pixel-level prediction system can receive a request for a pixel-wise classification prediction from another application or algorithm (or can determine that a time threshold for completing a pixel-wise classification prediction has expired). In some cases, the pixel-level prediction system receives a request for a pixel-wise classification prediction before the final pixel-wise classification prediction is complete. In such circumstances, the pixel-level prediction system can generate and provides a pixel-wise classification prediction generated via an early exit head.

As suggested above, the pixel-level prediction system can provide several advantages over conventional image classification systems. For example, embodiments of the pixel-level prediction system can improve computing efficiency over conventional systems. In particular, compared to conventional systems that must complete voluminous layers of an entire neural network to produce a prediction, the pixel-level prediction system can preserve computing resources such as processing power and memory by implementing an early exit framework for generating pixel-wise classification predictions without needing to compute, or iterate through, the entire neural network. In addition, the pixel-level prediction system can save computing cost (while maintaining accuracy) by utilizing a confidence adaptivity scheme. In particular, by generating a pixel mask based on determining confidence scores the pixel-level prediction system can determine which pixels (or corresponding features) to further process at subsequent stages of the multi-exit pixel-level prediction neural network (and which pixels to forego in subsequent layers).

In addition, embodiments of the pixel-level prediction system can also improve speed over conventional image classification systems. For example, by generating multiple pixel-wise classification predictions utilizing early exit heads, the pixel-level prediction system generates usable results to provide to client devices before iterating through all layers of a multi-exit pixel-level prediction neural network. Thus, the pixel-level prediction system can generate predictions more quickly than conventional systems that require computing an entire convolutional neural network to generate a prediction.

Additionally, the pixel-level prediction system can further provide improved flexibility over conventional image classification systems. For example, in contrast to many conventional systems that are not adaptable to time-critical or low-resource use cases, the pixel-level prediction system is well suited for adaptation in scenarios where generating predictions is time sensitive and/or performed via a lower-power device such as a mobile device. For example, the pixel-level prediction system is adaptable for generating (real-time) pixel-level predictions for vehicle recognition in traffic navigation (or autonomous vehicle) systems. Indeed, due its improved speed in generating pixel-wise classification prediction via early exit heads, the pixel-level prediction system can operate more quickly than conventional systems and can provide predictions for time-critical use cases. Moreover, the pixel-level prediction system can flexibly adapt to generate classification predictions at the pixel level, rather than only at the image level. Additionally, unlike conventional systems that implement standard inference techniques (which take an equal amount of computation time at each pixel), the pixel-level prediction system can account for spatial structure by utilizing pixels masks as part of a confidence-adaptive technique to reduce computation costs for better deployment on mobile (and other low power) devices.

As suggested by the foregoing discussion, this disclosure utilizes a variety of terms to describe features and benefits of the pixel-level prediction system. Additional detail is hereafter provided regarding the meaning of these terms as used in this disclosure. In particular, the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data.

Relatedly, the term "multi-exit pixel-level prediction neural network" refers to a neural network that generates classification predictions at a pixel level utilizing one or more early exit heads. In particular, a multi-exit pixel-level prediction neural network includes multiple sets of layers for extracting features and multiple early exit heads corresponding to the sets of layers for generating pixel-wise classification predictions from the extracted features at each respective stage. Indeed, the multi-exit pixel-level prediction neural network includes layers such as convolutional layers (e.g., layers that convolve features or perform convolution operations) to extract features representing observable and/ or unobservable characteristics of a digital image. For example, in some embodiments, the multi-exit pixel-level prediction neural network is a modified version of an HRNet architecture (e.g., HRNet-W48 or HRNet-W18) or a different deep convolutional architecture.

As mentioned, in some embodiments, the pixel-level prediction system generates a pixel-wise classification prediction utilizing an early exit head of the multi-exit pixel-level prediction neural network. As used herein, the term "exit head" (or sometimes "early exit head") refers to a neural network structure or architecture that generates a prediction or output. In particular, an exit head includes a set of neural network layers that generates, from features extracted at an intermediate stage of a neural network, an output in the form of a pixel-wise classification prediction. For example, an early exit head includes a number of layers for processing (e.g., via convolution, pooling, and/or interpolation) extracted features to generate a pixel-wise classification prediction. In some cases, an early exit head includes an encoder-decoder structure for downsampling extracted features by a downsample measure.

Relatedly, the term "downsample measure" refers to an amount or a degree of downsampling. For instance a downsample measure includes a degree of downsampling applied to features to reduce a resolution of the features and/or to increase a receptive field (e.g., associated with a particular pixel or pixel's features). In some cases, a downsample measure is referred to as a downsample ratio and is based on a number of layers within an early exit head, or within an encoder and/or a decoder that make up the early exit head.

Additionally, the term "pixel-wise classification prediction" refers to a prediction of labels or classifications of individual pixels (or a subset of pixels from a digital image). For example, a pixel-wise classification prediction includes predicted values corresponding to classifications, where a given predicted value corresponds to a pixel (or subset of pixels) of a digital image. In some cases, a pixel-wise classification prediction includes colors or other representations of distinct labels or classifications. For instance, a pixel-wise classification prediction refers to a pixel-wise spatial map with colors or numbers or other representations arranged to reflect semantic segmentation of a digital image (e.g., where different colors correspond to different labels). The pixel-level prediction system can generate a variety of different classification predictions. For example, in some embodiments, a pixel-wise classification prediction includes representations of joints and/or segments for human pose estimation.

As mentioned above, in some embodiments, the pixel-level prediction system generates a pixel mask indicated masked and unmasked pixels (or corresponding features) for a digital image. As used herein, the term "pixel mask" refers to a spatial mask that indicates pixels (e.g., features corresponding to pixels) to analyze (or skip) in future layers of a neural network. For example, a pixel mask can indicate pixels (e.g., predicted classifications or values corresponding to the pixels) that that satisfy a pixel mask confidence threshold. Similarly, a pixel mask can indicate pixels (e.g., predicted values corresponding to pixels) that fail to satisfy the pixel mask confidence threshold. Thus, a masked pixel or a masked feature refers to a pixel (e.g., a feature corresponding to a pixel) that is hidden or prevented from subsequent processing (e.g., via convolution). Conversely, an unmasked pixel or an unmasked feature refers to a pixel or feature that is not hidden and that is convolved at subsequent stages. As indicated by the foregoing examples, processing, analyzing, utilizing, or masking "pixels," can include processing, analyzing, utilizing, or masking features (e.g., feature vector), predicted values, or confidence scores representing/corresponding to the pixels.

As further mentioned, in certain implementations, the pixel-level prediction system generates a masked feature map and an interpolated feature map. As used herein, the term "masked feature map" refers to a collection or arrangement of features (e.g., a feature map) with one or more masked, hidden, or unanalyzed portions/locations. For example, a masked feature map can include a set of features with a subset of features that are masked or designated as hidden or preserved from a previous prediction (e.g., with a satisfactory confidence score). Additionally, an "interpolated feature map" refers to a collection or arrangement of features with one or more portions generated via interpolation. For example, in one or more embodiments, an interpolated feature map i generated from a masked feature map by interpolating masked features or pixels that have predicted values with satisfactory confidence scores (e.g., that satisfy a confidence threshold).

Additional detail regarding the pixel-level prediction system will now be provided with reference to the figures. For example, FIG. 1 illustrates a schematic diagram of an example system environment for implementing a pixel-level prediction system 102 in accordance with one or more embodiments. An overview of the pixel-level prediction system 102 is described in relation to FIG. 1. Thereafter, a more detailed description of the components and processes of the pixel-level prediction system 102 is provided in relation to the subsequent figures.

As shown, the environment includes server(s) 104, a client device 110, a database 112, and a network 114. Each of the components of the environment communicate via the network 114, and the network 114 is any suitable network over which computing devices communicate. Example networks are discussed in more detail below in relation to FIG. 10.

As mentioned, the environment includes a client device 110. The client device 110 is one of a variety of computing devices, including a smartphone, a tablet, a smart television, a desktop computer, a laptop computer, a virtual reality device, an augmented reality device, or another computing device as described in relation to FIG. 10. Indeed, unlike many conventional systems, the pixel-level prediction system 102 is capable of operation on a mobile device for generating fast predictions of digital image depictions at the pixel level. Although FIG. 1 illustrates a single instance of the client device 110, in some embodiments, the environment includes multiple different client devices, each associated with a different user (e.g., a digital image editor). The client device 110 communicates with the server(s) 104 via the network 114. For example, the client device 110 receives user input from a user interacting with the client device 110 (e.g., via a client application) to, for instance, edit, modify, or generate digital content, such as a digital image. Thus, the pixel-level prediction system 102 on the server(s) 104 receives information or instructions to generate pixel-level predictions for what is depicted in a digital image.

As shown in FIG. 1, the client device 110 includes a client application 118. In particular, the client application 118 is a web application, a native application installed on the client device 110 (e.g., a mobile application, a desktop application, etc.), or a cloud-based application where all or part of the functionality is performed by the server(s) 104. The client application 118 presents or displays information to a user, including an image editing interface or an image pixel classification interface. For example, a user interacts with the client application 118 to provide user input to predict classifications for pixels of one or more digital images.

As illustrated in FIG. 1, the environment includes the server(s) 104. The server(s) 104 generates, tracks, stores, processes, receives, and transmits electronic data, such as digital image modifications and indications of user interactions. For example, the server(s) 104 receives data from the client device 110 in the form of an indication of a user interaction to generate pixel-wise classification predictions for a digital image. In addition, the server(s) 104 transmits data to the client device 110 to cause the client device 110 to display or present one or more pixel-wise classification predictions (e.g., for multiple early exit heads). For example, the server(s) generate a pixel-wise classification prediction based on the timing of user interaction to, for instance, generate and provide an earlier pixel-wise classification prediction (from an earlier early exit head) for an earlier user interaction and to generate and provide a later pixel-wise classification prediction (from a later early exit head) for a later user interaction. Indeed, the server(s) 104 communicates with the client device 110 to transmit and/or receive data via the network 114. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server.

As further shown in FIG. 1, the server(s) 104 also includes the pixel-level prediction system 102 as part of a digital content editing system 106. For example, in one or more implementations, the digital content editing system 106 can store, generate, modify, edit, enhance, provide, and/or share digital content, such as digital images or digital videos. For example, the digital content editing system 106 can crop, enhance, or modify digital images based on pixel-level predictions of objects portrayed in the digital images. In some implementations, the digital content editing system 106 supports the generation of pixel-wise classification predictions at the server(s) 104 or the client device 110. Indeed, in one or more implementations, the server(s) includes all, or a portion of, the pixel-level prediction system 102. In some cases, the pixel-level prediction system 102 generates and provides a pixel-wise classification prediction to the client device 110 (e.g., as part of an image editing application). In these or other cases, the client device 110 includes all or part of the pixel-level prediction system 102 to, for example, obtain (e.g., download) and implement the multi-exit pixel-level prediction neural network with learned parameters from the server device(s) 104.

In some implementations, as illustrated in FIG. 1, the pixel-level prediction system 102 is located in whole or in part of the client device 110. For example, the pixel-level prediction system 102 includes a web hosting application that allows the client device 110 to interact with the server(s) 104. To illustrate, in one or more implementations, the client device 110 accesses a web page supported and/or hosted by the server(s) 104. For example, the client device 110 provides a digital image to the server(s) 104 along with a request to generate a pixel-wise classification prediction, and, in response, the pixel-level prediction system 102 on the server(s) 104 generates the pixel-wise classification prediction. The server(s) 104 then provides the pixel-wise classification prediction to the client device 110 for display.

The digital content editing system 106 communicates with the client device 110 to perform various functions associated with the pixel-level prediction system 102, such as storing and managing a repository of digital images, generating pixel-wise classification predictions, and providing pixel-wise classification predictions for display. Indeed, as further shown in FIG. 1, the environment includes the database 112. For example, the pixel-level prediction system 102 communicates with the database 112 to access a repository of digital images and/or access or store pixel-wise classification predictions.

As illustrated in FIG. 1, the pixel-level prediction system 102 (at the server(s) 104 and/or at the client device 110) also includes the multi-exit pixel-level prediction neural network 108. In particular, the multi-exit pixel-level prediction neural network 108 receives digital images and/or generates pixel-wise classification predictions. For example, the multi-exit pixel-level prediction neural network 108 generates multiple pixel-wise classification prediction from an input digital image using early exit heads to identify labels or classifications for pixels of the digital image. In some embodiments, the multi-exit pixel-level prediction neural network 108 has a novel architecture including multiple early exit heads including encoder-decoder structures as described in further detail below.

Although FIG. 1 illustrates a particular arrangement of the environment, in some embodiments, the environment has a different arrangement of components and/or may have a different number or set of components altogether. For instance, as mentioned, the pixel-level prediction system 102 is implemented by (e.g., located entirely or in part on) the client device 110 and/or a third-party device. In some embodiments, the multi-exit pixel-level prediction neural network 108 is located exclusively on the same server(s) 104, while in other embodiments, the multi-exit pixel-level prediction neural network 108 is located entirely on in part on the client device 110. In addition, in one or more embodiments, the client device 110 communicates directly with the pixel-level prediction system 102, bypassing the network 114. Further, in some embodiments, the database 112 is located external to the server(s) 104 (e.g., in communication via the network 114) or located on the server(s) 104 and/or on the client device 110.

Figure 2:
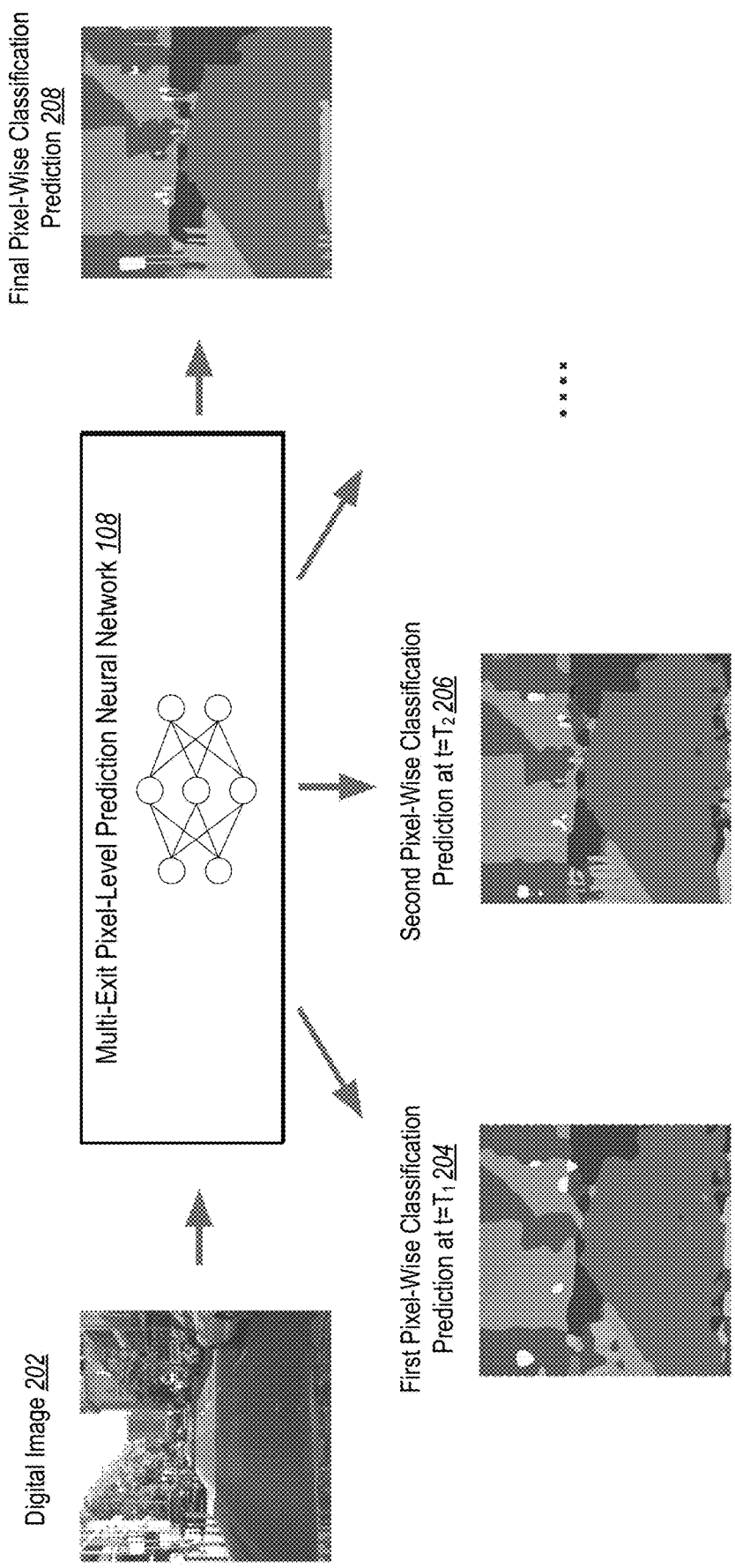
FIG. 2 illustrates an overview of generating different pixel-wise classification predictions at different stages of a multi-exit pixel-level prediction neural network in accordance with one or more embodiments.

As mentioned, in one or more embodiments, the pixel-level prediction system 102 generates multiple pixel-wise classification predictions using a multi-exit pixel-level prediction neural network (e.g., the multi-exit pixel-level prediction neural network 108). In particular, the pixel-level prediction system 102 utilizes early exit heads of the multi-exit pixel-level prediction neural network 108 to generate pixel-wise classification predictions. FIG. 2 illustrates an example overview of generating pixel-wise classification predictions using the multi-exit pixel-level prediction neural network 108 in accordance with one or more embodiments. The description of FIG. 2 provides an overview of the various acts and methods involved in generating pixel-wise classification predictions. Additional detail is provided thereafter with reference to subsequent figures.

As illustrated in FIG. 2, the pixel-level prediction system 102 analyzes or process a digital image 202. In particular, the pixel-level prediction system 102 analyzes the digital image 202 to generate pixel-wise classification predictions indicating classifications of objects depicted (at least partially) by individual pixels of the digital image 202. Indeed, as shown, the pixel-level prediction system 102 inputs the digital image 202 into the multi-exit pixel-level prediction neural network 108. In turn, the multi-exit pixel-level prediction neural network 108 generates and outputs the first pixel-wise classification prediction 204, the second pixel-wise classification prediction 206, and the final pixel-wise classification prediction 208 at different exit heads.

In some embodiments, the multi-exit pixel-level prediction neural network 108 generates only a particular number of pixel-wise classification predictions based on timing of a request for a prediction (e.g., a user interaction requesting a prediction, expiration of a time threshold, or a request from another application). For example, the pixel-level prediction system 102 receives an indication of user interaction requesting a pixel-wise classification prediction of the digital image 202. Based on the timing of the user interaction, the multi-exit pixel-level prediction neural network 108 generates and provides the first pixel-wise classification prediction 204, the second pixel-wise classification prediction 206, or some other pixel-wise classification prediction.

To elaborate, based on user interaction via the client device 110 (e.g., a mobile device), the pixel-level prediction system 102 provides the digital image 202 to the multi-exit pixel-level prediction neural network 108, whereupon the multi-exit pixel-level prediction neural network 108 begins generating the pixel-wise classification predictions at different stages. In response to further user interaction on the client device 110 requesting a pixel-wise classification prediction, the pixel-level prediction system 102 provides one of the pixel-wise classification predictions. Thus, if the further user interaction occurs after the multi-exit pixel-level prediction neural network 108 completes generation of the final pixel-wise classification prediction 208, then the pixel-level prediction system 102 provides the final pixel-wise classification prediction 208 for display on the client device 110.

However, if the further response is more urgent and is received before completion of the entire analysis, the pixel-level prediction system 102 provides one of the pixel-wise classification predictions generated by an early exit head of the multi-exit pixel-level prediction neural network 108. Specifically, in one or more embodiments, the pixel-level prediction system 102 provides a latest-stage (e.g., most recent) pixel-wise classification prediction generated when the further user interaction is received. For instance, if the pixel-level prediction system 102 receives an indication of user interaction at a time (e.g., $t=T_{1.5}$) between generation of the first pixel-wise classification prediction 204 and generation of the second pixel-wise classification prediction 206, the pixel-level prediction system 102 provides the first pixel-wise classification prediction 204 for display on the client device 110.

Indeed, as shown, the multi-exit pixel-level prediction neural network 108 outputs the first pixel-wise classification prediction 204 for time $t=T_1$ and outputs the second pixel-wise classification prediction 206 for time $t=T_2$. In some cases, later pixel-wise classification predictions are more accurate than those generated at earlier stages. As illustrated in FIG. 2, the second pixel-wise classification prediction 206 includes detail not found in the first pixel-wise classification prediction 204. Additionally, the final pixel-wise classification prediction 208 includes further detail beyond that of the second pixel-wise classification prediction 206. Indeed, the multi-exit pixel-level prediction neural network 108 generates more accurate pixel-wise classification predictions as the analysis of the digital image 202 progresses through more and more layers at successive stages.

As mentioned, the early exiting approach enables the client device 110 to stop the inference process based on an input or an event. As set forth in the above example, in some cases, the computation budget B(x,t) for each instance x may be time dependent or input dependent, where t represents a time instant or an even that leads to a change in budget. In certain embodiments, B(x,t) is independent of x and depends only on t, such as in cases where the multi-exit pixel-level prediction neural network 108 generates pixel-wise classification predictions with less budget in more time-critical scenarios (e.g., high traffic times for vehicle recognition or autonomous driving). In other embodiments, B(x,t) is independent of t and depends only on x, regardless of external events.

In certain implementations, the pixel-level prediction system 102 not only utilizes the multi-exit pixel-level prediction neural network 108 to generate pixel-wise classification predictions, but the pixel-level prediction system 102 also trains or tunes the multi-exit pixel-level prediction neural network 108. In particular, the pixel-level prediction system 102 trains the pixel-level prediction system 102 to learn parameters or weights for various layers that result in generating accurate pixel-wise classification predictions. For example, the pixel-level prediction system 102 inputs a sample digital image into the multi-exit pixel-level prediction neural network 108, whereupon the multi-exit pixel-level prediction neural network 108 generates pixel-wise classification predictions at each early exit head (as described).

In addition, the pixel-level prediction system 102 compares pixel-wise classification predictions against a ground truth pixel-wise classification (e.g., a spatial map that indicates actual pixel-wise classifications for the sample digital image). Indeed, the pixel-level prediction system 102 compares a pixel-wise classification prediction generated via a first early exit head against a ground truth pixel-wise classification and repeats the comparison for other pixel-wise classification predictions generated at other early exit heads as well. In some cases, the pixel-level prediction system 102 utilizes a single ground truth pixel-wise classification across all early exit heads for comparing against each pixel-wise classification prediction, while in other cases the pixel-level prediction system 102 utilizes a different ground truth pixel-wise classification for each early exit head independently.

In some embodiments, the pixel-level prediction system 102 determines a measure of error or a loss associated with each early exit head based on the individual comparisons of the pixel-wise classification predictions against the ground truth pixel-wise classification. In addition, the pixel-level prediction system 102 determines a total loss or a cumulative loss by combining the individual losses associated with each respective pixel-wise classification prediction. In certain cases, the pixel-level prediction system 102 utilizes a specific loss function to determine the loss for each early exit head and/or for the multi-exit pixel-level prediction neural network 108 as a whole. Additional detail regarding the loss function is provided below with reference to subsequent figures.

Based on determining a total loss, the pixel-level prediction system 102 also performs a back propagation to update or modify parameters of the multi-exit pixel-level prediction neural network 108 to reduce or minimize the measure of loss. For example, the pixel-level prediction system 102 modifies parameters or weights for layers between early exit heads and/or part of early exit heads. In certain cases, the pixel-level prediction system 102 modifies the parameters to reduce the loss determined by comparison via the loss function.

In some embodiments, the pixel-level prediction system 102 repeats the foregoing training steps until the loss is reduced to satisfy a loss threshold and/or the accuracy of the pixel-wise classification predictions satisfies an accuracy threshold. For example, the pixel-level prediction system 102 inputs a new sample digital image into the multi-exit pixel-level prediction neural network 108, generates additional pixel-wise classification predictions via the multi-exit pixel-level prediction neural network 108, determines a loss by comparing the additional pixel-wise classification predictions to a new ground truth pixel-wise classification (corresponding to the new digital image), and back propagates to update or modify parameters to reduce the loss. In some cases, the pixel-level prediction system 102 repeats the training process for multiple iterations or epochs until the loss satisfies a threshold loss.

In one or more embodiments, as mentioned, the output of the multi-exit pixel-level prediction neural network 108 depends on the budget given, where the output is given by $f(x,B(x,t))$. Denoting the task loss function as L and y as a ground truth prediction, the per-instance loss is given by $L(f(x,B(x,t)),y)$. In certain embodiments, the expected training loss is represented as $\mathbb{E}_{(x,y) \sim (X,Y), t \sim T}[L(f(x,B(x,t)),y)]$, where (X,Y) is the input-output joint distribution and T is the distribution modeling the time or event variable. In one or more cases, the pixel-level prediction system 102 approximates the expected training loss by the empirical average and optimizes using back-propagation with sampled input-output pairs and budgets.

Figure 3:
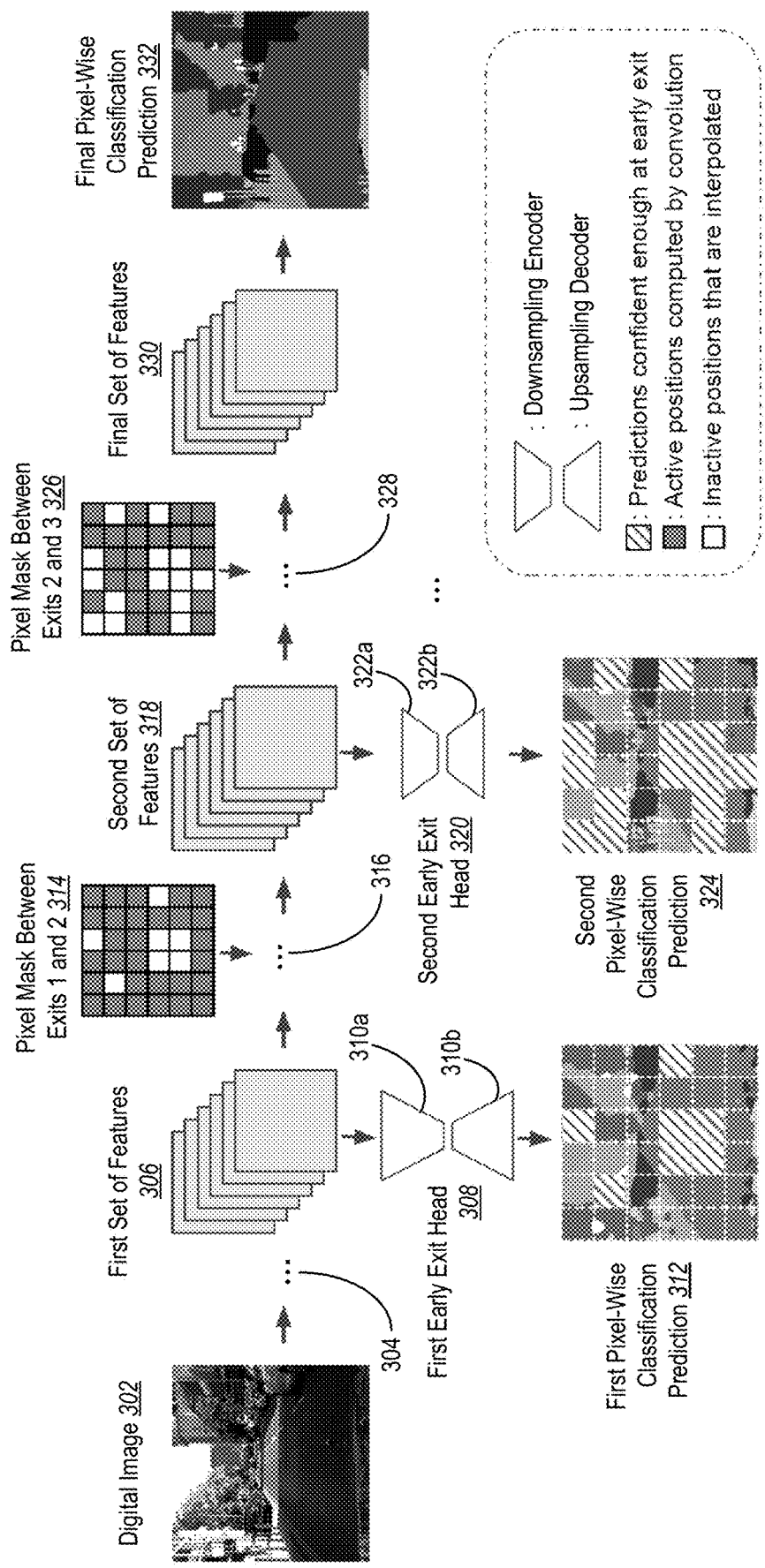
FIG. 3 illustrates an example process for generating multiple pixel-wise classification predictions at different early exit heads of a multi-exit pixel-level prediction neural network in accordance with one or more embodiments.

As mentioned, in one or more embodiments, the pixel-level prediction system 102 utilizes a multi-exit pixel-level prediction neural network 108 to generate multiple pixel-wise classification predictions. In particular, the pixel-level prediction system 102 utilizes early exit heads of the multi-exit pixel-level prediction neural network 108 to generate respective pixel-wise classification predictions. FIG. 3 illustrates generating pixel-wise classification predictions utilizing different early exit heads of the multi-exit pixel-level prediction neural network 108 in accordance with one or more embodiments.

As illustrated in FIG. 3, the multi-exit pixel-level prediction neural network 108 is depicted in a distributed fashion, with multiple sets of layers spread out to show the different stages of generating pixel-wise classification predictions. For example, the multi-exit pixel-level prediction neural network 108 includes a first set of layers 304, a second set of layers 316, and a final set of layers 328, each spread out to show different outputs and processes involved in generating respective pixel-wise classification predictions. In some embodiments, the multi-exit pixel-level prediction neural network 108 includes more than three sets of layers, and the architecture of FIG. 3 is merely an example.

To elaborate, the pixel-level prediction system 102 inputs a digital image 302 into the first set of layers 304. In turn, the first set of layers 304 extracts a first set of features 306 from the digital image 302. In addition, the pixel-level prediction system 102 utilizes the first early exit head 308 to generate a first pixel-wise classification prediction 312 from the first set of features 306. More specifically, the first early exit head 308 downsamples the first set of features 306 into a lower resolution utilizing an encoder 310a and further upsamples back to an output resolution utilizing a decoder 310b. As shown, the encoder 310a and the decoder 310b are part of the encoder-decoder structure of the first early exit head 308.

Similarly, the encoder 322a and the decoder 322b are part of the encoder-decoder structure of the second early exit head 320. Indeed, the pixel-level prediction system 102 further utilizes a second early exit head 320 to generate a second pixel-wise classification prediction 324 from a second set of features 318. Specifically, the pixel-level prediction system 102 utilizes a second set of layers 316 to extract the second set of features 318 from the first set of features 306 (and/or the digital image 302). In addition, the pixel-level prediction system 102 utilizes the second early exit head 320 to generate the second pixel-wise classification prediction 324.

As shown, the second early exit head 320 appears squatter or shorter than the first early exit head 308 in FIG. 3. Indeed, the early exit heads have different numbers of layers in their respective encoder-decoder structures to downsample extracted features by different amounts, or by different downsample measures. For instance, the pixel-level prediction system 102 utilizes the first early exit head 308 to downsample the first set of features 306 by a first downsample measure and utilizes the second early exit head 320 to downsample the second set of features 318 by a second downsample measure (less than the first downsample measure). The pixel-level prediction system 102 downsamples more at earlier layers to compensate for the smaller receptive fields in sampling more local features at earlier stages. Additional detail regarding the specific structure of the early exit heads is provided below with reference to subsequent figures.

As further illustrated in FIG. 3, the pixel-level prediction system 102 generates different pixel-wise classification predictions from the different early exit heads. For example, the pixel-level prediction system 102 generates the first pixel-wise classification prediction 312 utilizing the first early exit head 308. In addition, the pixel-level prediction system 102 generates the second pixel-wise classification prediction 324 utilizing the second early exit head 320. Each pixel-wise classification prediction indicates predicted values corresponding to pixels or portions of the digital image 302. Indeed, the pixel-level prediction system 102 generates predicted values for labels or classifications of the pixels for semantic segmentation or human pose estimation.

As shown, the pixel-level prediction system 102 generates the first pixel-wise classification prediction 312 indicating pixels (e.g., features corresponding to pixels) that satisfy a pixel mask confidence threshold (as represented by the patterned squares). To elaborate, the pixel-level prediction system 102 determines confidence scores for predicted values generated as part of the first pixel-wise classification prediction 312. In addition, the pixel-level prediction system 102 compares the confidence scores against a pixel mask confidence threshold to determine whether or not to mask the features (or pixels) corresponding to the predicted values.

For those features (or pixels) whose predicted values satisfy the pixel mask confidence threshold, the pixel-level prediction system 102 matriculates those values through (or preserves them) to prevent additional processing at additional layers and exits. For subsequent stages, the pixel-level prediction system 102 thus avoids reprocessing or re-convolving the features or pixels with predicted values that are sufficiently confident. Indeed, as illustrated in FIG. 3, the pixel-level prediction system 102 generates a pixel mask 314 to mask those features (or pixels) whose confidence scores satisfy the pixel mask confidence threshold (as represented by the white squares). The pixel-level prediction system 102 leaves the remaining features (or pixels) that fail to satisfy the pixel mask confidence threshold unmasked for further processing (e.g., convolution) at later stages. Additional detail regarding determining confidence scores and masking features (or pixels) is provided below with reference to subsequent figures.

In some embodiments, the pixel-level prediction system 102 utilizes the pixel mask 314 to designate pixels (or features) to process further through convolution and pixels (or features) to refrain from processing further through convolution. Moreover, as illustrated, in some embodiments, the pixel-level prediction system 102 interpolates features for masked pixels indicated by the pixel mask 314. To elaborate, the pixel-level prediction system 102 identifies masked pixels (e.g., those that satisfy a confidence threshold) as sufficiently confident and that need no further convolution. However, leaving large gaps in a feature map with no features can result in sparsity issues in applying subsequent layers of the neural network. Accordingly, in some embodiments the pixel-level prediction system 102 interpolates the unmasked features to neighboring masked pixel positions to provide some contextual data in applying subsequent layers of the neural network. For example, instead of convolving a masked pixel, the pixel-level prediction system 102 combines features to generate an interpolated feature value for the masked pixel. Additional detail regarding interpolation is provided hereafter with particular reference to FIG. 6.

As illustrated in FIG. 3, the pixel-level prediction system 102 further extracts the second set of features 318. From the second set of features 318, the pixel-level prediction system 102 generates the second pixel-wise classification prediction 324 utilizing the second early exit head 320. As shown, the second pixel-wise classification prediction 324 includes additional predicted values, on top of those in the first pixel-wise classification prediction 312, that satisfy the pixel mask confidence threshold. Indeed, the pixel-level prediction system 102 determines confidence scores for the predicted values of the second pixel-wise classification prediction 324 and compares the confidence scores with a pixel mask confidence threshold. Based on the comparison, the pixel-level prediction system 102 identifies features (or pixels) whose predicted values satisfy the confidence threshold and generates the pixel mask 326 to mask those features (or pixels) accordingly. Indeed, as shown, the pixel mask 326 includes white squares indicating those features (or pixels) that are masked because they are sufficiently confident.

As further illustrated in FIG. 3, the pixel-level prediction system 102 utilizes a final set of layers 328 to extract the final set of features 330. In addition, the pixel-level prediction system 102 utilizes the final exit head to generate the final pixel-wise classification prediction 332 from the final set of features 330. Given enough time without interruption requesting an earlier prediction, the pixel-level prediction system 102 generates the final pixel-wise classification prediction 332 (e.g., the most complete and accurate) generated from the multi-exit pixel-level prediction neural network 108. As mentioned above, in some embodiments, the multi-exit pixel-level prediction neural network 108 includes more than two early exit stages, each including a set of layers to extract a corresponding set of features from which to generate a pixel-wise classification prediction using an early exit head.

The above description of the multi-exit pixel-level prediction neural network 108 in FIG. 3 can be expressed using mathematical notation as well. To elaborate, most standard convolutional neural networks have only a single prediction head at a final stage. Generally, a standard convolutional neural network takes an input x, forwards the input x through intermediate layers, and finally outputs the prediction at the head. As illustrated in FIG. 3, however, the multi-exit pixel-level prediction neural network 108 includes multiple prediction heads, including a first early exit head 308, a second early exit head 320, and a final prediction head (not shown). Indeed, the first early exit head 308 generates a first pixel-wise classification prediction 312, the second early exit head 320 generates a second pixel-wise classification prediction 324, and the final prediction head generates the final pixel-wise classification prediction 332.

Suppose a convolutional neural network had k early exits at intermediate layers with layer indices $l_1 \ldots, l_k$, where $l_1$ represents the first set of layers 304. The intermediate features at these intermediate layers can be represented by $F_{l_1}(x) \ldots, F_{l_k}(x)$, and the functions of the early exit heads can be represented by $E_1 \ldots, E_k$, where $E_1$ represents the first early exit head 308. In some cases, the early exit heads (e.g., the $E_i$s) have the same form, but they do not share weights. In certain embodiments, the pixel-level prediction system 102 generates pixel-wise classification predictions denoted by:

$$\hat{y}=E_i(F_{l_i}(x))$$

i=1 . . . k where i represents the stage or exit corresponding to a respective set of layers and a respective early exit head. As mentioned above, the pixel-level prediction system 102 propagates features through layers of the multi-exit pixel-level prediction neural network 108, and upon reaching the computation budget or in response to user interaction requesting an early pixel-wise classification prediction, the pixel-level prediction system 102 provides the most recent $\hat{y}_i$ (pixel-wise classification prediction) generated.

As discussed previously, in some embodiments, the pixel-level prediction system 102 learns parameters for the multi-exit pixel-level prediction neural network 108 utilizing a training or tuning process. To elaborate, the pixel-level prediction system 102 repeatedly i) inputs a sample digital image into the multi-exit pixel-level prediction neural network 108, ii) generates pixel-wise classification predictions utilizing early exit heads of the pixel-wise classification prediction, iii) compares the pixel-wise classification predictions to a ground truth pixel-wise classification to determine a measure of loss (e.g., via a loss function), and iv) back propagates to modify parameters of the multi-exit pixel-level prediction neural network 108 to reduce the measure of loss. In some cases, the pixel-level prediction system 102 repeats the training steps until the measure of loss satisfies a loss threshold.

In one or more implementations, the pixel-level prediction system 102 determines the loss utilizing a total loss function or a cumulative loss function that combines measures of loss associated with pixel-wise classification predictions generated at each of (or a subset of) the early exit heads. In some cases, the pixel-level prediction system 102 utilizes a loss function to determine a weighted combination of losses associated with respective early exit heads.

Specifically, the aforementioned loss function can be illustrated with mathematical notation that aligns with the terms defined above. For instance, together with the original final pixel-wise classification prediction $\hat{y}_{k+1}$, the pixel-level prediction system 102 utilizes a total loss function to learn parameters of the multi-exit pixel-level prediction neural network 108, as given by:

$$L_{total} \sum_{i=1}^{k+1} w_i \, L(\hat{y}_i, y)$$

where $w_i$ is the weight coefficient at exit i. Indeed, the pixel-level prediction system 102 learns parameters of the multi-exit pixel-level prediction neural network 108 utilizing a training or a tuning process. The pixel-level prediction system 102 trains the multi-exit pixel-level prediction neural network 108, together with each early exit head, to reduce a measure of loss associated with the total loss function above. In some cases, the pixel-level prediction system 102 uses weight values of 1 for all exits.

Figure 4:
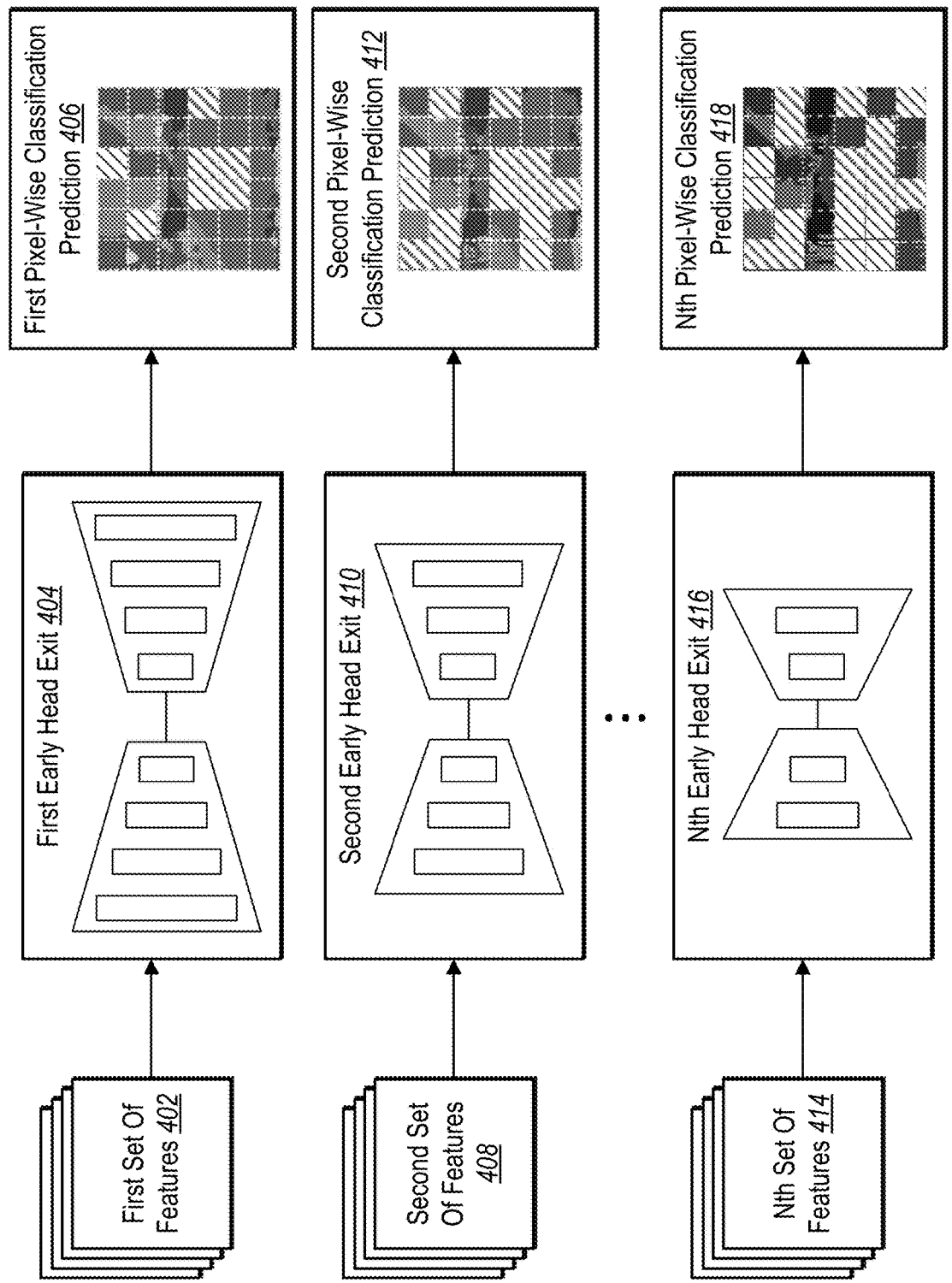
FIG. 4 illustrates example encoder-decoder structures of multiple early exit heads of a multi-exit pixel-level prediction neural network in accordance with one or more embodiments.

As further mentioned, the early exit heads of the multi-exit pixel-level prediction neural network 108 have a novel encoder-decoder structure to improve predictions on the pixel level. In particular, each first early exit head (e.g., the first early exit head 308 and the second early exit head 320) includes an encoder-decoder structure with a different number of convolution layers for downsampling by different downsample measures (and for subsequently upsampling to an output resolution). FIG. 4 illustrates example encoder-decoder structures of various early exit heads in accordance with one or more embodiments.

As illustrated in FIG. 4, the multi-exit pixel-level prediction neural network 108 includes multiple early exit heads, including the first early exit head 404 (e.g., the first early exit head 308), the second early exit head 410 (e.g., the second early exit head 320), and the Nth early exit head 416. As shown, each of the early exit heads includes a different number of layers, represented by the rectangles within the encoder and decoder trapezoidal shapes. The first early exit head 404 includes the highest number of convolution layers in the encoder (e.g., the trapezoid tapering smaller from left to right) to downsample the first set of features by a downsample measure larger than any subsequent downsample measure. The second early exit head 410 includes fewer convolution layers than the first early exit head 404 but more than the Nth early exit head 416 to downsample the second set of features 408 by a second downsample measure less than the first downsample measure but more than an Nth downsample measure.

To elaborate, a convolutional neural network can have a hierarchical structure that begins with shallow, fine, and more local features and ends with deep, coarse, and more global features. These deeper features represent more image content by their larger receptive fields (e.g., they "consider" a larger portion or more context of a digital image). For pixel-level recognition, on the other hand, the pixel-level prediction system 102 the pixel-level prediction system 102 utilizes early exit heads to downsample and subsequently upsample (e.g., to restore lost resolution during the downsampling). By utilizing early exit heads with encoder-decoder structures, the pixel-level prediction system 102 ensures precise spatial correspondence between input and output.

Because the multi-exit pixel-level prediction neural network 108 learns its most local features at earlier exits (e.g., via the first early exit head 404), the pixel-level prediction system 102 utilizes a specialized architecture to prevent noisy, inaccurate results. Indeed, the pixel-level prediction system 102 utilizes the encoder-decoder structure for the early exit heads to downsample by different measures at different early exits to accommodate smaller receptive fields at earlier early exits and larger receptive fields at later early exits. In particular, the first downsample measure of the first early exit head 404 is the largest to reduce the spatial resolution the most and therefore increase the output's receptive field the most for the most local features. At each successive early exit head, the downsample measure decreases as the receptive field increases for more global features.

In some embodiments, the pixel-level prediction system 102 utilizes each early exit head, denoted by $E_i$, to downsample its respective input features $F_i(x)$, through a series of pooling and 1×1 convolution layers. For example, the first early exit head 404 downsamples the first set of features 402 (e.g., the first set of features 306) by a first downsample measure using the pooling and convolution layers of its encoder. Each pooling operation halves the spatial resolution of the first set of features 402, effectively increasing its output's receptive field. Through the subsequent convolution, the pixel-level prediction system 102 learns coarser-level features specifically for the first pixel-wise classification prediction 406 from the first early exit head 404.

After a number D of these "pool-conv" layers in the encoder, the pixel-level prediction system 102 utilizes the decoder of the first early exit head 404 (e.g., the trapezoid shape increasing in size from left to right) to upsample the features back to an output resolution (e.g., the initial resolution of the digital image 302). For instance, the pixel-level prediction system 102 utilizes an equal number (D) of bilinear interpolation and 1×1 convolution layers ("interpolate-conv" layers) to upsample the downsampled first set of features back to an output resolution. The pixel-level prediction system 102 thus generates the output from the decoder as the first pixel-wise classification prediction 406, or the first $\hat{y}_i$. In some embodiments, 1×1 convolution layers are used in the encoder and the decoder to reduce computation, while in other embodiments the convolution layers have different dimensions. Although the foregoing paragraphs describe a particular example architecture, it will be appreciated that the pixel-level prediction system 102 can utilize alternative architectures, including different layers, a different number of layers, and a different number/type of exit heads.

As further illustrated in FIG. 4, and in a fashion similar to that described above in relation to the first early exit head 404, the pixel-level prediction system 102 utilizes the second early exit head 410 to generate the second pixel-wise classification prediction 412. In particular, the pixel-level prediction system 102 utilizes the encoder of the second early exit head 410 to downsample the second set of features 408 by a second downsample measure. As shown, the encoder within the second early exit head 410 includes fewer layers (e.g., pooling layers and/or convolution layers) than the encoder of the first early exit head 404. As a result, the second downsample measure is less than the first downsample measure. Indeed, because later stages have larger receptive fields, as discussed, later early exit heads downsample less than those that came before. Thus, the decoder of the second early exit head 410 also includes fewer layers (e.g., interpolation and/or convolution layers) to upsample back to an output resolution (e.g., the initial resolution of the digital image 302).

The pixel-level prediction system 102 continues to generate pixel-wise classification predictions for successive early exits through the Nth early exit head 416, provided the computation budget allows for it and no user interaction intervenes. Indeed, as shown in FIG. 4, the pixel-level prediction system 102 generates the Nth pixel-wise classification prediction 418 from the Nth set of features 414 utilizing the Nth early exit head 416. Similar to the above discussion, the Nth early exit head 416 includes fewer layers than the first early exit head 404 and the second early exit head 410 because less downsampling is needed.

In one or more embodiments, the downsample measure at each early exit is based on the number D of layers (e.g., pooling layers and/or convolution layers) in the corresponding early exit head (e.g., within the encoder or the decoder). In some cases, the pixel-level prediction system 102 downsamples by a downsample measure based on a number of consecutive pool-cony layers. Features at earlier layers are more fine-level, and the early exit head branching from an earlier set of layers (e.g., the first early exit head 404 branching from a first set of layers) benefits from more downsampling. In one or more embodiments, the pixel-level prediction system 102 utilizes a number of downsampling operations (or pool-cony layers) in an encoder, as given by:

$$D=N-i$$

where i represents an index of the exit or stage and N is the total number of exits (including the final original exit) in the multi-exit pixel-level prediction neural network 108. For instance, if the multi-exit pixel-level prediction neural network 108 includes 4 total exits, the first early exit head 404 will have 3 pool-cony layers for downsampling and 3 interpolate-cony layers for upsampling. The second early exit head 410 would then have 2 layers in its encoder and 2 layers in its decoder, and so on until the final exit head which has 0 layers for downsampling.

In cases where an early exit head includes more than one layer, the first convolution (e.g., from the first pool-cony layer) will transform the number of channels to a fixed number for all exits. In these or other cases, the pixel-level prediction system 102 sets the channel width relatively small to save computation across the added layers of the encoder-decoder structure for early exit heads.

Figure 5:
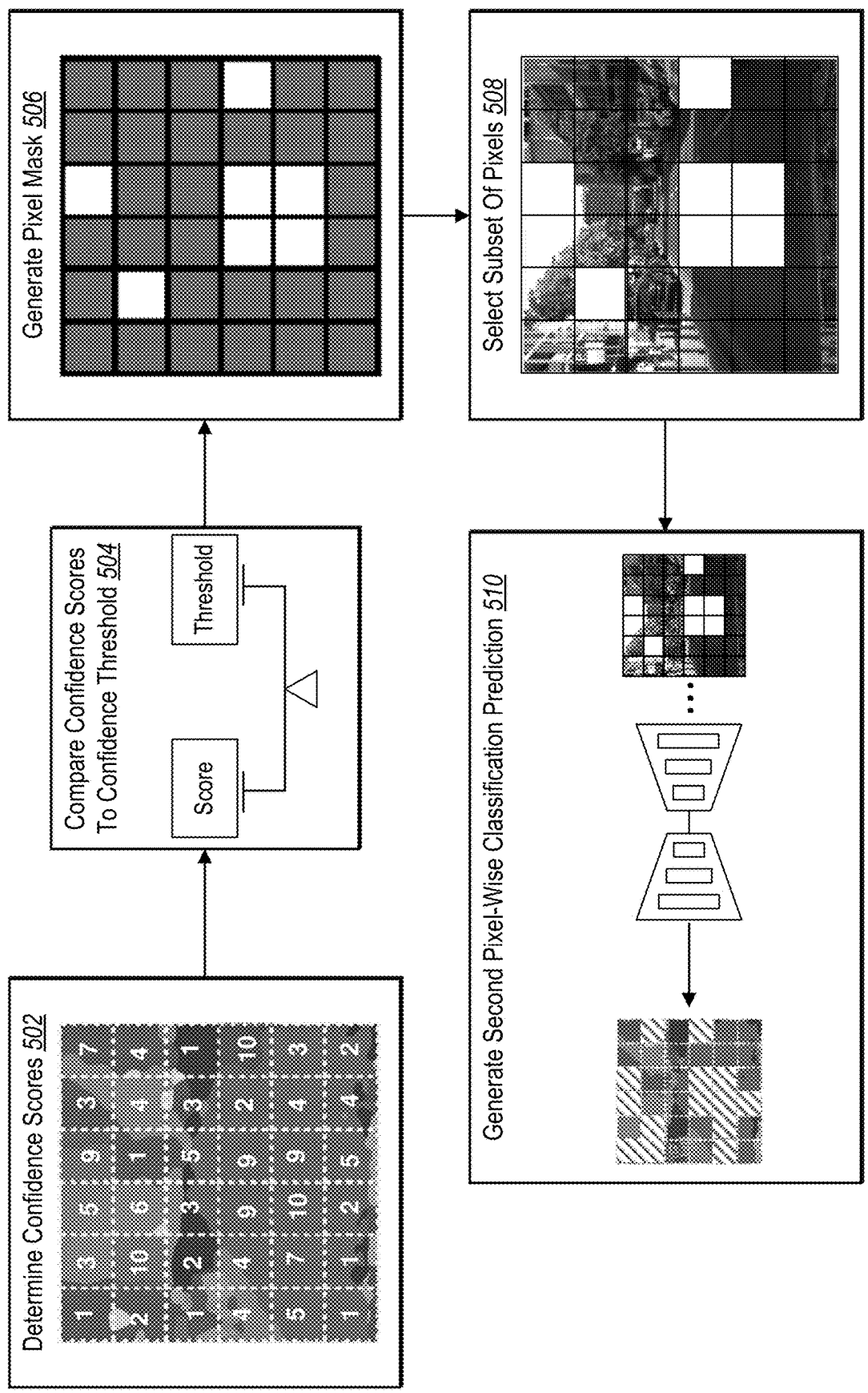
FIG. 5 illustrates an example process for generating a second pixel-wise classification prediction based on confidence scores for a pixel mask in accordance with one or more embodiments.

As mentioned, in one or more embodiments, the pixel-level prediction system 102 generates pixel-wise classification predictions based on processing unmasked features and refraining from processing masked features. In particular, the pixel-level prediction system 102 generates pixel masks to mask features (corresponding to particular pixels) whose predicted values satisfy a pixel mask confidence threshold. FIG. 5 illustrates an example process for generating a second pixel-wise classification prediction (e.g., the second pixel-wise classification prediction 324 or 412) based on masking features (or pixels) in accordance with one or more embodiments.

As illustrated in FIG. 5, the pixel-level prediction system 102 performs an act 502 to determine confidence scores. More specifically, the pixel-level prediction system 102 determines confidence scores for predicted values of a pixel-wise classification prediction (e.g., the first pixel-wise classification prediction 406). Indeed, the pixel-level prediction system 102 determines predicted values (e.g., labels or classifications) for the features extracted from a digital image (e.g., the digital image 302) and further determines confidence scores to indicate how confident each predicted value is for each pixel (e.g., features corresponding to each pixel)). In cases where the pixel-level prediction system 102 is performing semantic segmentation, the pixel-level prediction system 102 determines a confidence score for a given pixel (or feature) in the form of a maximum probability across all possible classes or labels. As shown in FIG. 5, the pixel-level prediction system 102 determines confidence scores on a scale from 1-10, where 10 is a highest confidence score. In other embodiments, the pixel-level prediction system 102 determines confidence scores on a different scale (e.g., 0 to 1, or 1 to 100).

As shown, the pixel-level prediction system 102 further performs an act 504 to compare the confidence scores to a confidence threshold. In particular, the pixel-level prediction system 102 compares the confidence scores determined via the act 502 against a pixel mask confidence threshold. Based on the comparison, the pixel-level prediction system 102 identifies features (corresponding to particular pixels) that satisfy the pixel mask confidence threshold and further identifies features (corresponding to other pixels) that fail to satisfy the pixel mask confidence threshold. As shown in FIG. 5, the pixel-level prediction system 102 uses a pixel mask confidence threshold of 8, though additional or alternative pixel mask confidence thresholds are possible.

Additionally, the pixel-level prediction system 102 performs an act 506 to generate a pixel mask. Specifically, the pixel-level prediction system 102 generates the pixel mask to mask out those pixels or features whose predicted values satisfy the pixel mask confidence threshold. As shown, there are 7 features or pixels that satisfy the pixel mask confidence threshold, with confidence scores of either 9 or 10. Thus, the pixel-level prediction system 102 generates the pixel mask to mask those features (or pixels) to prevent further convolution of those features in later stages of the multi-exit pixel-level prediction neural network 108. As shown, the pixel mask includes white squares for masked feature and dark gray squares for unmasked features (e.g., features that will be subject to further convolution at later stages). In some embodiments, the pixel-level prediction system 102 generates a pixel mask in accordance with:

$$M_i(p) = \begin{cases} 0, & \text{if confidence score } (\hat{y}_i(p)) \geq \text{pixel mask conf.threshold} \\ 1, & \text{otherwise} \end{cases}$$

where $M_i(p)$ represents the pixel mask generated based on a pixel-wise classification prediction $\hat{y}_i$ with pixels (or features) indexed by p. For any convolution layer between the early exit head i (denoted $E_1$) and the next early exit head i+1 (denoted $E_{i+1}$), the pixel-level prediction system 102 determines whether to perform or skip computation at position p based on the pixel mask.

As further illustrated in FIG. 5, the pixel-level prediction system 102 performs an act 508 to select a subset of pixels. More specifically, the pixel-level prediction system 102 selects features corresponding to a subset of pixels, such as unmasked pixels indicated by the pixel mask. Thus, the pixel-level prediction system 102 further processes the selected pixels (or their features) using convolution layers to generate additional pixel-wise classification predictions. Conversely, as also shown, the pixel-level prediction system 102 masks pixels (or features of pixels) of a digital image (e.g., the digital image 302) using the pixel mask and refrains from further processing the masked features with convolution layers.

In addition, the pixel-level prediction system 102 performs an act 510 to generate a second pixel-wise classification prediction (e.g., the second pixel-wise classification prediction 412). In particular, the pixel-level prediction system 102 generates the second pixel-wise classification prediction from the selected pixels (or their features) that are unmasked in the pixel map. To elaborate, the pixel-level prediction system 102 further processes the selected pixels using a second set of layers to extract a second set of features. Additionally, the pixel-level prediction system 102 utilizes a second early exit head to downsample and upsample the second set of features to generate the second pixel-wise classification prediction. In some cases, the pixel-level prediction system 102 refrains from processing the unselected (e.g., masked) pixels indicated by the feature map.

In some embodiments, the pixel-level prediction system 102 repeats the acts of FIG. 5 for subsequent early exit heads. For instance, the pixel-level prediction system 102 i) determines new confidence scores for the second pixel-wise classification prediction (generated via the act 510), ii) compares the confidence scores to the pixel mask confidence threshold, iii) generates a pixel mask, iv) selects a subset of pixels, and v) generates an additional pixel-wise classification prediction for each stage or exit of the multi-exit pixel-level prediction neural network 108.

Figure 6:
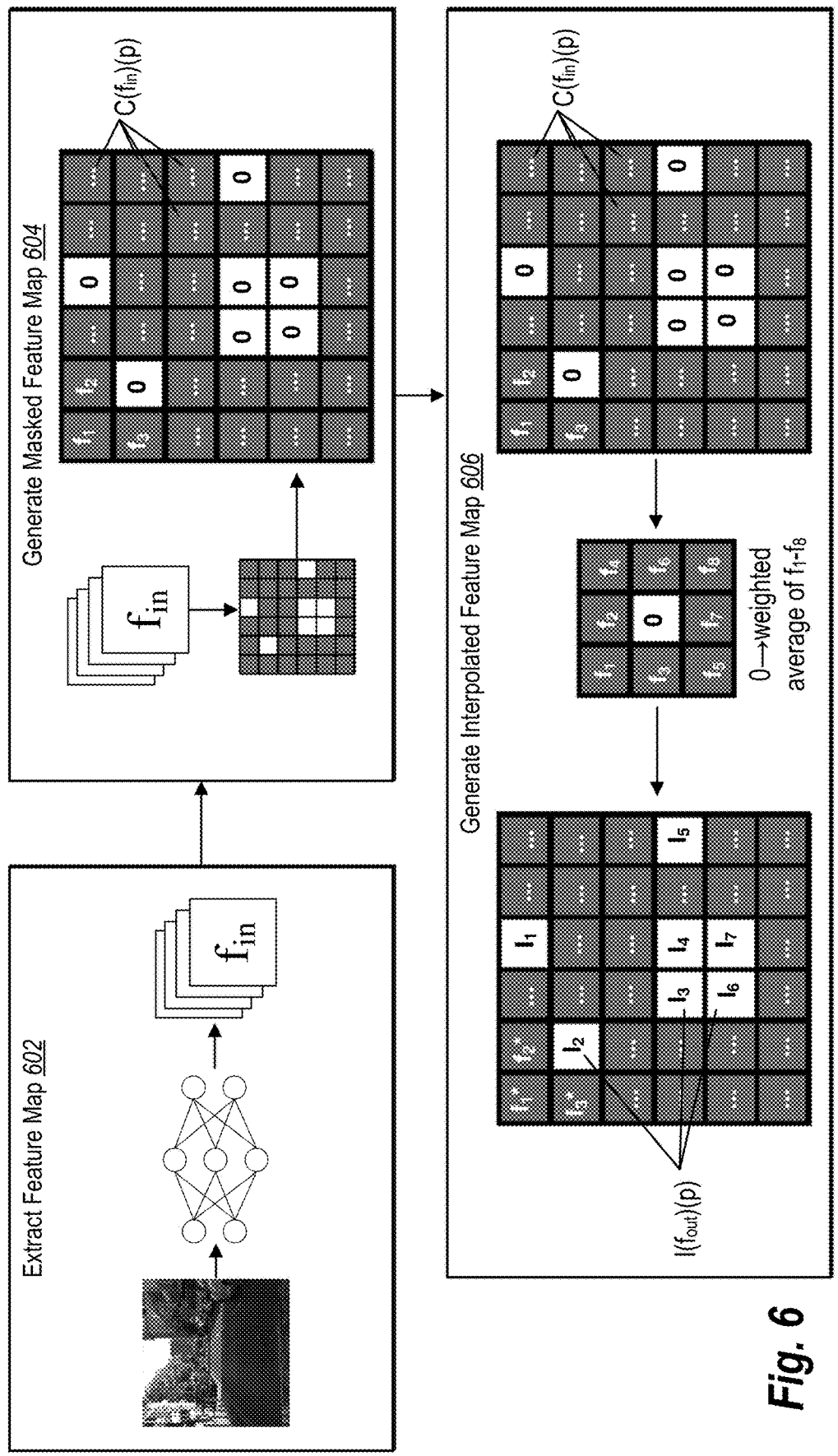
FIG. 6 illustrates an example process for generating an interpolated feature map in accordance with one or more embodiments.

As mentioned, in certain described embodiments, the pixel-level prediction system 102 generates pixel-wise classification predictions from features extracted from a digital image. In particular, the pixel-level prediction system 102 extracts a feature map from a digital image (e.g., the digital image 302), modifies the feature map at various stages using a pixel mask and an interpolation technique, and passes the interpolated feature map to a subsequent set of layers for further feature extraction to generate a subsequent pixel-wise classification prediction. FIG. 6 illustrates an example series of acts for generating a masked feature map and an interpolated feature map in accordance with one or more embodiments.

As illustrated in FIG. 6, the pixel-level prediction system 102 performs an act 602 to extract a feature map. More specifically, the pixel-level prediction system 102 extracts a feature map from a digital image utilizing a set of layers of the multi-exit pixel-level prediction neural network 108. As shown, the feature map includes a set of features and is denoted by $f_{in}$. Indeed, the pixel-level prediction system 102 extracts the feature map to represent the digital image with a set of features indicating observable and/or unobservable characteristics of the digital image.

In addition, the pixel-level prediction system 102 performs an act 604 to generate a masked feature map. In particular, the pixel-level prediction system 102 generates a masked feature map based on a pixel mask (and corresponding confidence scores). As described above, the pixel-level prediction system 102 determines confidence scores for predicted values of a pixel-wise classification prediction. In addition, the pixel-level prediction system 102 compares those confidence scores to a pixel mask confidence threshold. Based on the comparison, the pixel-level prediction system 102 generates a pixel mask to indicate pixels (or features) that satisfy the pixel mask confidence threshold and to further indicate pixels (or features) that do not. As shown in FIG. 6, the feature map $f_{in}$ leads into the pixel mask.

From the pixel mask, the pixel-level prediction system 102 further generates the masked feature map. Specifically, the pixel-level prediction system 102 masks features from the initially extracted feature map $f_{in}$ using the pixels mask (e.g., as generated in the act 506 of FIG. 5). Thus, as illustrated in FIG. 6, the pixel-level prediction system 102 generates a masked feature map to indicate features that are sufficiently confident and that, therefore, need no further convolution processing. In some embodiments, the pixel-level prediction system 102 generates the masked feature map in accordance with:

$$f_{out}(p) = \begin{cases} C(f_{in})(p), & \text{if } M_i(p) = 1, \\ 0, & \text{if } M_i(p) = 0 \end{cases}$$

where $f_{out}(p)$ represents the masked feature map generated from the extracted feature map $f_{in}$ after masking utilizing the pixel mask $M_i(p)$, and where C represents a convolution layer. If the output of C does not share the same spatial size as the pixel mask $M_i(p)$, the pixel-level prediction system 102 interpolates the pixel-wise classification prediction $\hat{y}_i$ to the same size of C's output.

As further illustrated in FIG. 6, the pixel-level prediction system 102 performs an act 606 to generate an interpolated feature map. In particular, to compensate for cases where $f_{out}(p)$ is sparse and could potentially harm further convolutional computation, the pixel-level prediction system 102 spatially interpolates "0" positions with values from neighboring feature channels. For example, the pixel-level prediction system 102 interpolates a masked feature (or pixel) by combining features from surrounding pixels. As shown, for instance, the pixel-level prediction system 102 changes a "0" value for a masked pixel to a weighted average of features from 8 surrounding pixels. The pixel-level prediction system 102 repeats the interpolation for masked pixels to generate the interpolated feature map.

In some embodiments, the pixel-level prediction system 102 interpolates pixels or features to generate an interpolated feature map in accordance with:

$$f^*_{out}(p) = \begin{cases} f_{out}(p), & \text{if } M_i(p) = 1, \\ I(f_{out})(p), & \text{if } M_i(p) = 0 \end{cases}$$

where $f_{out}(p)$ represents the interpolated feature map and I represents an interpolation operation. In some cases, the pixel-level prediction system 102 determines $I(f_{out})(p)$ as the weighted average of all the neighboring pixels centered at p within a radius r. In these or other cases, the pixel-level prediction system 102 considers a square neighborhood of pixels within the radius, as shown in FIG. 6 (e.g., where $f_1$-$f_8$ are within the radius r from the "0" pixel). In some cases, the pixel-level prediction system 102 repeats the interpolation operation for each masked pixel in the index p (e.g., each "0" pixel in FIG. 6).

In one or more embodiments, the pixel-level prediction system 102 determines interpolated values for each masked pixel (or feature) in accordance with:

$$I(f_{out})(p) = \frac{\Sigma_{s \in \Omega(p)} W_{(p,s)} f_{out}(s)}{\Sigma_{s \in \Omega(p)} W_{(p,s)}}$$

where s indexes p's neighboring pixels, $\Omega(p)$ is the neighborhood of p such that $\Omega(p) = \{s \| s-p \|_\infty \leq r, s \neq p\}$, and $W_{(p,s)}$ is the weight assigned to point s for interpolating at p. In some implementations, the pixel-level prediction system 102 uses a radial basis function ("RBF") kernel as a distance-based exponential decaying weighting scheme, as given by:

$$W_{(p,s)} = \exp(-\lambda^2 \| p-s \|_2^2)$$

where $\lambda$ is a trainable learning parameter. According to the above formula, the pixel-level prediction system 102 assigns larger weights to values of s that are closer top.

By generating an interpolated feature map in this way, the pixel-level prediction system 102 uses a more efficient process than conventional systems. Indeed, many conventional systems spend an equal amount of computation at each input position, even in cases where recognition in some areas is easier than in others. For instance, the inner part of a large sky segment of a digital image may be easy to recognize, whereas the boundary between a bicycle and a person riding it may be need more careful delineation. Thus, by generating and utilizing an interpolated feature map based on confidence scores to generate pixel-wise classification predictions, the pixel-level prediction system 102 accommodates further analysis at more complex regions and saves computation over less complex regions.

To elaborate, the pixel-level prediction system 102 utilizes the interpolated feature map to dictate or designate which pixels (or features) are further convolved at subsequent layers of the multi-exit pixel-level prediction neural network 108. For instance, the pixel-level prediction system 102 passes an interpolated feature map generated based on a first pixel-wise classification prediction to a second set of layers, whereupon the second set of layers extracts a second set of features from the interpolated feature map (e.g., at a different resolution).

Upon extracting the second set of features (e.g., a new feature map) from the interpolated feature map, the pixel-level prediction system 102 applies a pixel mask to the second set of features. As described above, the pixel-level prediction system 102 also applies the pixel mask generated from the first set of extracted features to further process unmasked features (e.g., features corresponding to a "1" in the pixel mask) utilizing a second early exit head (e.g., the second early exit head 410). For masked features (e.g., features corresponding to a "0" in the pixel mask), on the other hand, the pixel-level prediction system 102 preserves or reuses the predicted values generated via the previous early exit head (e.g., the first early exit head 404). Indeed, the pixel-level prediction system 102 refrains from generating additional predicted values for masked features using convolutional layers at subsequent early exit heads.

As mentioned, replacing filtering with interpolation at the already-confident spatial locations ($M_i(p)=0$) saves substantial amounts of computation in some situations. The pixel-level prediction system 102 utilizes the pixel mask $M_i$ for all convolutions between the exit i and the exit i+1. Once the pixel-level prediction system 102 forward passes to arrive at the next exit to generate the pixel-wise classification prediction $\hat{y}_{i+1}$, the pixel-level prediction system 102 carries over the previous predictions where $M_i(p)=0$ (having already been deemed confident enough at the previous exit and having been skipped during further computation). Thus, in some embodiments, the pixel-level prediction system 102 generates a subsequent pixel-wise classification prediction based on an interpolated feature map in accordance with:

$$\hat{y}_{i+1}(p) = \begin{cases} E_{i+1}(F_{l_{i+1}}(x)), & \text{if } M_i(p) = 1, \\ \hat{y}_i(p), & \text{if } M_i(p) = 0 \end{cases}$$

where $F_{l_{i+1}}(x)$ are the input features for the early exit head $E_{i+1}$, and the remaining terms are defined above.

FIG. 6 (and the preceding figures) illustrates generating pixel-wise classification predictions for semantic segmentation—labeling different objects depicted by individual pixels within digital images (e.g., road pixels, sidewalk pixels, tree pixels, car pixels, etc.). However, the pixel-level prediction system 102 and the multi-exit pixel-level prediction neural network 108 are able to generate pixel-wise classification predictions for other applications or domains as well. For example, in some embodiments, the pixel-level prediction system 102 generates pixel-wise classification predictions that indicate joints of a human body for human pose estimation. Indeed, the description herein of generating pixel-wise classification predictions is similarly applicable for human pose estimation (or other classification/estimation schemes).

To elaborate, the pose search system 102 utilizes the multi-exit pixel-level prediction neural network 108 to generate pixel-wise classification predictions from a digital image via early exit heads. For instance, the pixel-level prediction system 102 generates a first pixel-wise classification prediction utilizing a first early exit head to indicate pixels corresponding to particular human body joints. Indeed, in some cases, a pixel-wise classification prediction includes predicted values or predicted representations of joints depicted by individual pixels of a digital image. For example, the pixel-level prediction system 102 generates a pixel-wise classification prediction that indicates wrist pixels, elbow pixels, shoulder pixels, knee pixels, hip pixels, and/or other joint-specific pixels.

Similar to the above description relating to semantic segmentation, the pixel-level prediction system 102 further generates a pixel mask and an interpolated feature map from the pixel-wise classification prediction. Indeed, the pixel-level prediction system 102 determines confidence scores for pixels (or features) indicating measures of confidence in correctly predicting depicting joints, compares those confidence scores against a pixel mask confidence threshold, and identifies pixels (or features) that are sufficiently confident (and those that are not). The pixel-level prediction system 102 thus generates a pixel mask to mask confident pixels (or features) and to leave non-confident pixels (or features) unmasked.

Additionally, the pixel-level prediction system 102 generates an interpolated feature map by convolving unmasked, non-confident pixels (or features) and interpolating masked, confident pixels. As described above, the pixel-level prediction system 102 utilizes a subsequent set of layers of the multi-exit pixel-level prediction neural network 108 extract additional features from the interpolated feature map. From the additional features, the pixel-level prediction system 102 generates an additional pixel-wise classification prediction (indicating predictions of depicted joints at the pixel level) by convolving unmasked pixels (or features) utilizing a subsequent early exit head and by reusing or preserving predicted values corresponding to masked pixels (or features).

In some embodiments, the pose estimation task is formulated as a regression problem. The pixel-level prediction system 102 utilizes the multi-exit pixel-level prediction neural network 108 to generate 16 spatial feature maps, each regressing its corresponding body joint (e.g., from among 16 possible body joints). In some embodiments, the pixel-level prediction system 102 codes the only positive target for each type as 1 and codes all negatives as 0. Unlike in semantic segmentation, the output at each pixel is not necessarily a probability distribution, so the pixel-level prediction system 102 instead uses a maximum value across all 16 channels (corresponding to the 16 possible joints) as the confidence measure to determine confidence scores.

Thus, the pixel-level prediction system 102 masks a pixel (or its corresponding feature(s)) upon determining that its maximum output value (and hence all values) at the pixel position is smaller than a pixel mask confidence threshold (making it unlikely to be a joint prediction). In some cases, the pixel-level prediction system 102 utilizes a value of 0.002 as the pixel mask confidence threshold with cross validation, as a larger value makes the pixel mask too sparse and can hurt learning.

As mentioned above, the pixel-level prediction system 102 can provide improved computing efficiency over conventional systems. In some cases, the pixel-level prediction system 102 not only provides improved efficiency, but also provides improved accuracy in determining correct pixel-level predictions for a digital image (e.g., for semantic segmentation). FIG. 7 illustrates a table 702 depicting experimental results from comparing the pixel-level prediction system 102 against conventional systems in accordance with one or more embodiments.

As illustrated in FIG. 7, researchers have demonstrated the improvements of an example implementation of the pixel-level prediction system 102. The table 702 includes results from a particular experiment comparing an example implementation of the pixel-level prediction system 102 with baseline systems such as a conventional convolutional neural network with a single final exit ("Conventional Model") and the Multiscale Deep Equilibrium Network ("MDEQ"). For the experiment, researchers utilized the Cityscapes dataset consisting of 2048×1024 images of urban street scenes with semantic segmentation annotation of 19 different classes. All models were trained with the training set and reported results on the validation set within the Cityscapes dataset.

To represent the accuracy of each model, researchers used the mean intersection-over-union ("mIoU" %) metric. To represent computational efficiency, the researchers used the number of floating point operations ("FLOPs") performed. As shown, the pixel-level prediction system 102 improves over the conventional systems in higher accuracy, less computation, and more predictions. As shown, the nomenclature "RH" stands for "redesigned heads" and indicates a multi-exit pixel-level prediction neural network with the described encoder-decoder structure for the early exit heads in accordance with one or more embodiments. Additionally, "CA" stands for "confidence adaptivity" and indicates a multi-exit pixel-level prediction neural network that incorporates the determination of confidence scores to generate a pixel mask and an interpolated feature map as part of generating pixel-wise classification predictions in accordance with one or more embodiments. Notably, the example embodiment of the pixel-level prediction system 102 improves substantially in the computation column, with far fewer FLOPs than the conventional systems (while also showing improved accuracy).

Figure 8:
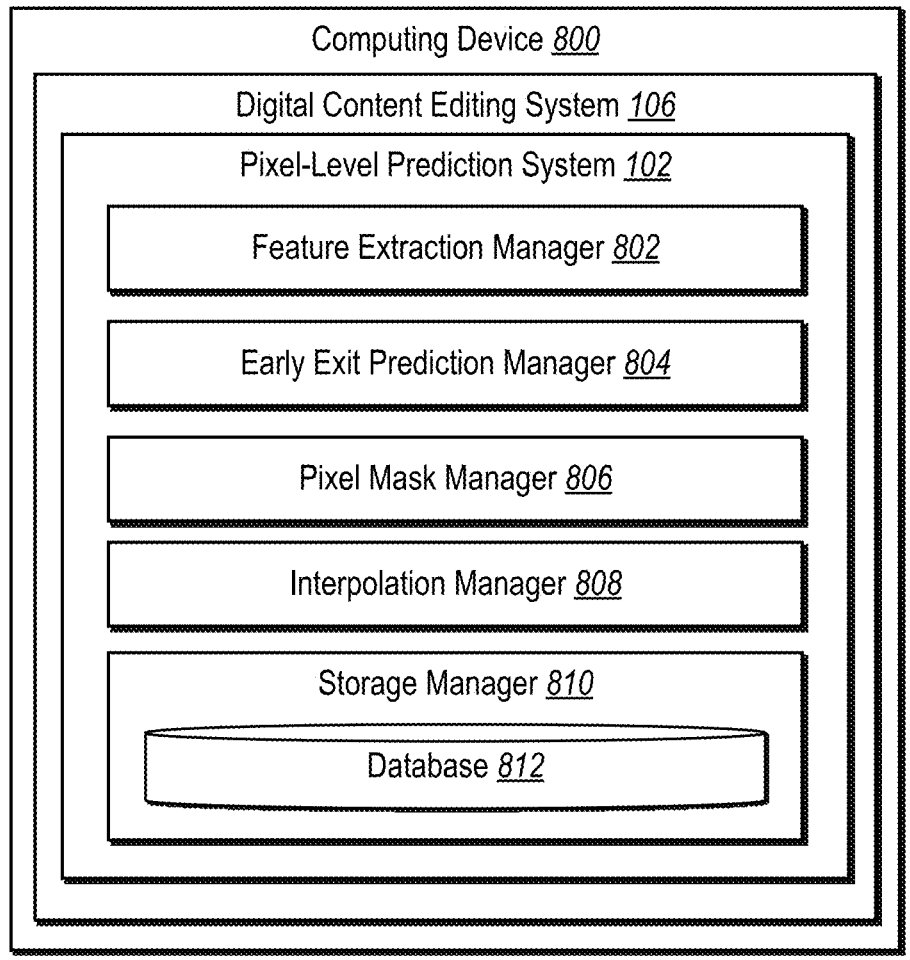
FIG. 8 illustrates a schematic diagram of a pixel-level prediction system in accordance with one or more embodiments.

Looking now to FIG. 8, additional detail will be provided regarding components and capabilities of the pixel-level prediction system 102. Specifically, FIG. 8 illustrates an example schematic diagram of the pixel-level prediction system 102 on an example computing device 800 (e.g., one or more of the client device 110 and/or the server(s) 104). In some embodiments, the computing device 800 refers to a distributed computing system where different managers are located on different devices, as described above. As shown in FIG. 13, the pixel-level prediction system 102 includes a feature extraction manager 802, an early exit prediction manager 804, a pixel mask manager 806, an interpolation manager 808, and a storage manager 810.

As just mentioned, the pixel-level prediction system 102 includes a feature extraction manager 802. In particular, the feature extraction manager 802 manages, maintains, determines, generates, extracts, or encodes features from a digital image. For example, the feature extraction manager 802 analyzes a digital image utilizing a multi-exit pixel-level prediction neural network to extract a set of features or a feature map representing all (or portions of) the digital image. In some cases, the feature extraction manager 802 extracts features in a spatially aware sense, where features correspond to particular spatial locations, or pixels, of a digital image.

In addition, the pixel-level prediction system 102 includes an early exit prediction manager 804. In particular, the early exit prediction manager 804 manages, maintains, determines, generates, provides, displays, or presents a pixel-wise classification prediction utilizing an early exit head. For example, the early exit prediction manager 804 utilizes an early exit head for each stage of a multi-exit pixel-level prediction neural network to generate respective pixel-wise classification predictions at each stage. In some cases, the early exit prediction manager 804 utilizes an early exit head to downsample by a particular downsample measure and to determine predicted values (indicating predicted classes) from features extracted from a digital image.

As shown, the pixel-level prediction system 102 further includes a pixel mask manager 806. In particular, the pixel mask manager 806 manages, maintains, generates, determines, produces, or identifies a pixel mask. For example, the pixel mask manager 806 generates a pixel mask based on a prior pixel-wise classification prediction to mask certain pixels and to leave other pixels unmasked. In some cases, the pixel mask manager 806 determines confidence scores for a pixel-wise classification prediction and compares the confidence scores to a pixel mask confidence threshold. Based on the comparison, the pixel mask manager 806 generates the pixel mask to mask pixels (e.g., features corresponding to pixels) whose confidence scores satisfy the pixel mask confidence threshold.

Further, the pixel-level prediction system 102 includes an interpolation manager 808. In particular, the interpolation manager 808 manages, maintains, generates, determines, or identifies an interpolated feature map. For example, the interpolation manager 808 interpolates pixels (or corresponding features) masked by a pixel mask to determine weighted average feature values for the interpolated pixels. In addition, the interpolation manager 808 passes the interpolated feature map to a subsequent set of layers for further computation and convolution at successive exits.

The pixel-level prediction system 102 further includes a storage manager 810. The storage manager 810 operates in conjunction with, or includes, one or more memory devices such as the database 812 (e.g., the database 112) that store various data such as a repository of digital images, a multi-exit pixel-level prediction neural network 108 (including a first set of layers, a first early exit head associated with the first set of layers, a second set of layers, and a second early exit head associated with the second set of layers), and a repository of features or feature maps. The storage manager 810 (e.g., via a non-transitory computer memory/one or more memory devices) stores and maintains data associated with generating pixel-wise classification predictions utilizing early exit heads of a multi-exit pixel-level prediction neural network 108 (e.g., within the database 1312).

In one or more embodiments, each of the components of the pixel-level prediction system 102 are in communication with one another using any suitable communication technologies. Additionally, the components of the pixel-level prediction system 102 is in communication with one or more other devices including one or more client devices described above. It will be recognized that although the components of the pixel-level prediction system 102 are shown to be separate in FIG. 8, any of the subcomponents may be combined into fewer components, such as into a single component, or divided into more components as may serve a particular implementation. Furthermore, although the components of FIG. 8 are described in connection with the pixel-level prediction system 102, at least some of the components for performing operations in conjunction with the pixel-level prediction system 102 described herein may be implemented on other devices within the environment.

The components of the pixel-level prediction system 102 can include software, hardware, or both. For example, the components of the pixel-level prediction system 102 can include one or more instructions stored on a computer-readable storage medium and executable by processors of one or more computing devices (e.g., the computing device 800). When executed by the one or more processors, the computer-executable instructions of the pixel-level prediction system 102 can cause the computing device 800 to perform the methods described herein. Alternatively, the components of the pixel-level prediction system 102 can comprise hardware, such as a special purpose processing device to perform a certain function or group of functions. Additionally, or alternatively, the components of the pixel-level prediction system 102 can include a combination of computer-executable instructions and hardware.

Furthermore, the components of the pixel-level prediction system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the pixel-level prediction system 102 may be implemented as part of a stand-alone application on a personal computing device or a mobile device. Alternatively, or additionally, the components of the pixel-level prediction system 102 may be implemented in any application that allows creation and delivery of marketing content to users, including, but not limited to, applications in ADOBE® EXPERIENCE MANAGER and CREATIVE CLOUD®, such as ADOBE® PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-8 the corresponding text, and the examples provide a number of different systems, methods, and non-transitory computer readable media for generating and providing pixel-wise classification prediction utilizing early exit heads of a multi-exit pixel-level prediction neural network. In addition to the foregoing, embodiments can also be described in terms of flowcharts comprising acts for accomplishing a particular result. For example, FIG. 9 illustrates a flowchart of example sequences or series of acts in accordance with one or more embodiments.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for generating and providing pixel-wise classification predictions utilizing early exit heads of a multi-exit pixel-level prediction neural network. In particular, the series of acts 900 includes an act 902 of extracting a first set of features utilizing a first set of layers. For example, the act 902 involves extracting a first set of features from a digital image utilizing a first set of layers of a multi-exit pixel-level prediction neural network.

In addition, the series of acts 900 includes an act 904 of generating a first pixel-wise classification prediction. In particular, the act 904 involves generating a first pixel-wise classification prediction for the digital image from the first set of features utilizing a first early exit head of the multi-exit pixel-level prediction neural network. For example, the act 904 involves downsampling the first set of features by a first downsample measure utilizing the first early exit head. In some cases, the act 904 involves generating a first pixel-wise spatial map indicating a first set of predicted values for pixels of the digital image utilizing the first early exit head, wherein the first early exit head comprises a first encoder-decoder structure.

In certain embodiments, the act 904 involves utilizing the first early exit head by utilizing a first number of convolution layers of the first encoder-decoder structure to downsample by the first downsample measure. In these or other embodiments, the act 904 involves generating a first pixel-wise spatial map indicating a first set of predicted values for pixels of the digital image utilizing the first early exit head, wherein the first early exit head comprises a first encoder-decoder structure. In some case, the act 904 involves utilizing the first encoder-decoder structure which includes a first encoder including a first number of convolution layers for downsampling by the first downsample measure, and a first decoder including convolution layers for upsampling to an output resolution.

As further illustrated in FIG. 9, the series of acts 900 includes an act 906 of extracting a second set of features utilizing a second set of layers. In particular, the act 906 involves extracting a second set of features from the digital image and the first set of features utilizing a second set of layers of the multi-exit pixel-level prediction neural network. For example, the act 906 involves generating a pixel mask indicating pixels of the first pixel-wise classification that satisfy a pixel mask confidence threshold and pixels of the first pixel-wise classification that fail to satisfy the pixel mask confidence threshold. Further, the act 906 involves interpolating pixels indicated by the pixel mask as satisfying the pixel mask confidence threshold to generate an interpolated feature map from the first set of features extracted by the first set of layers of the multi-exit pixel-level prediction neural network. Further still, the act 906 involves extracting the second set of features from the interpolated feature map utilizing the second set of layers of the multi-exit pixel-level prediction neural network.

In some embodiments, the act 906 involves generating a masked feature map from the first set of features by masking a subset of features from the first set of features corresponding to pixels with confidence scores that satisfy a pixel mask confidence threshold, generating, from the masked feature map, an interpolated feature map by interpolating the masked subset of features from the first set of features corresponding to the pixels with the confidence scores that satisfy the pixel mask confidence threshold, and generating the second set of features from the interpolated feature map utilizing the second set of layers.

Additionally, the series of acts 900 includes an act 908 of generating a second pixel-wise classification prediction. In particular, the act 908 involves generating a second pixel-wise classification prediction for the digital image from the second set of features utilizing a second early exit head of the multi-exit pixel-level prediction neural network. For example, the act 908 involves downsampling the second set of features by a second downsample measure less than the first downsample measure utilizing the second early exit head. In some cases, the act 908 involves generating a second pixel-wise spatial map indicating a second set of predicted values for pixels of the digital image utilizing the second early exit head, wherein the second early exit head comprises a second encoder-decoder structure.

In certain embodiments, the act 908 involves utilizing the second early exit head by utilizing a second number of convolution layers of the second encoder-decoder structure to downsample by the second downsample measure. In these or other embodiments, the act 908 involves generating a second pixel-wise spatial map indicating a second set of predicted values for pixels of the digital image utilizing the second early exit head, wherein the second early exit head comprises a second encoder-decoder structure. In some cases, the act 908 involves utilizing the second encoder-decoder structure that includes a second encoder including a second number of convolution layers for downsampling by the second downsample measure, and a second decoder including convolution layers for upsampling to the output resolution.

In some embodiments, the series of acts 900 includes an act of determining confidence scores for predicted values within the first pixel-wise classification prediction. In addition, the series of acts 900 includes an act of generating a pixel mask by comparing the confidence scores for the predicted values of the first pixel-wise classification prediction to a pixel mask confidence threshold. In some cases, the series of acts 900 includes an act of selecting a subset of pixels of the digital image utilizing the pixel mask. Further, the series of acts 900 includes an act of generating the second pixel-wise classification prediction from the subset of pixels of the digital image utilizing the second early exit head.

In one or more cases, the series of acts 900 includes an act of generating, utilizing the second early exit head, the second pixel-wise classification prediction from the subset of pixels of the digital image according to confidence scores for predicted values within the first pixel-wise classification prediction. In these or other cases, the series of acts 900 includes an act of generating a third pixel-wise classification prediction by processing, utilizing a third early exit head, a different subset of pixels of the digital image according to different confidence scores for predicted values within the second pixel-wise classification prediction.

In certain embodiments, the series of acts 900 includes acts of determining confidence scores indicating measures of confidence that predicted values within the first pixel-wise classification prediction are accurate, comparing the confidence scores for the predicted values within the first pixel-wise classification prediction to a pixel mask confidence threshold, and generating a pixel mask indicating a first subset of pixels of the first pixel-wise classification that satisfy the pixel mask confidence threshold, and further indicating a second subset of pixels of the first pixel-wise classification that fail to satisfy the pixel mask confidence threshold. Determining the second pixel-wise classification prediction sometimes involves determining predicted values for the second subset of pixels utilizing the second early exit head.

In some embodiments, the series of acts 900 includes an act of generating a first pixel-wise spatial map for a digital image utilizing a first early exit head of a multi-exit pixel-level prediction neural network, the first pixel-wise spatial map including a first set of predicted classification values for pixels of the digital image. The series of acts 900 also includes an act of determining confidence scores for the first set of predicted classification values within the first pixel-wise spatial map and an act of generating, from the confidence scores, a pixel mask by comparing the confidence scores with a pixel mask confidence threshold. Further, the series of acts 900 includes an act of generating, from a subset of the pixels of the digital image selected using the pixel mask, a second pixel-wise spatial map for the digital image utilizing a second early exit head of the multi-exit pixel-level prediction neural network.

Generating the second pixel-wise spatial map sometimes involves utilizing the second early exit head to process the subset of the pixels by determining predicted values from features corresponding to the subset of the pixels. Generating the first pixel-wise spatial map sometimes involves extracting a first set of features from the digital image utilizing a first set of layers of the multi-exit pixel-level prediction neural network, and utilizing the first early exit head to downsample the first set of features by a first downsample measure.

Further, generating the second pixel-wise spatial map involves extracting a second set of features from the digital image utilizing a second set of layers of the multi-exit pixel-level prediction neural network, and utilizing the second early exit head to downsample the first set of features by a second downsample measure. In some cases, generating the pixel mask involves masking features of the digital image corresponding to predicted classification values within the first pixel-wise spatial map that satisfy the pixel mask confidence threshold.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
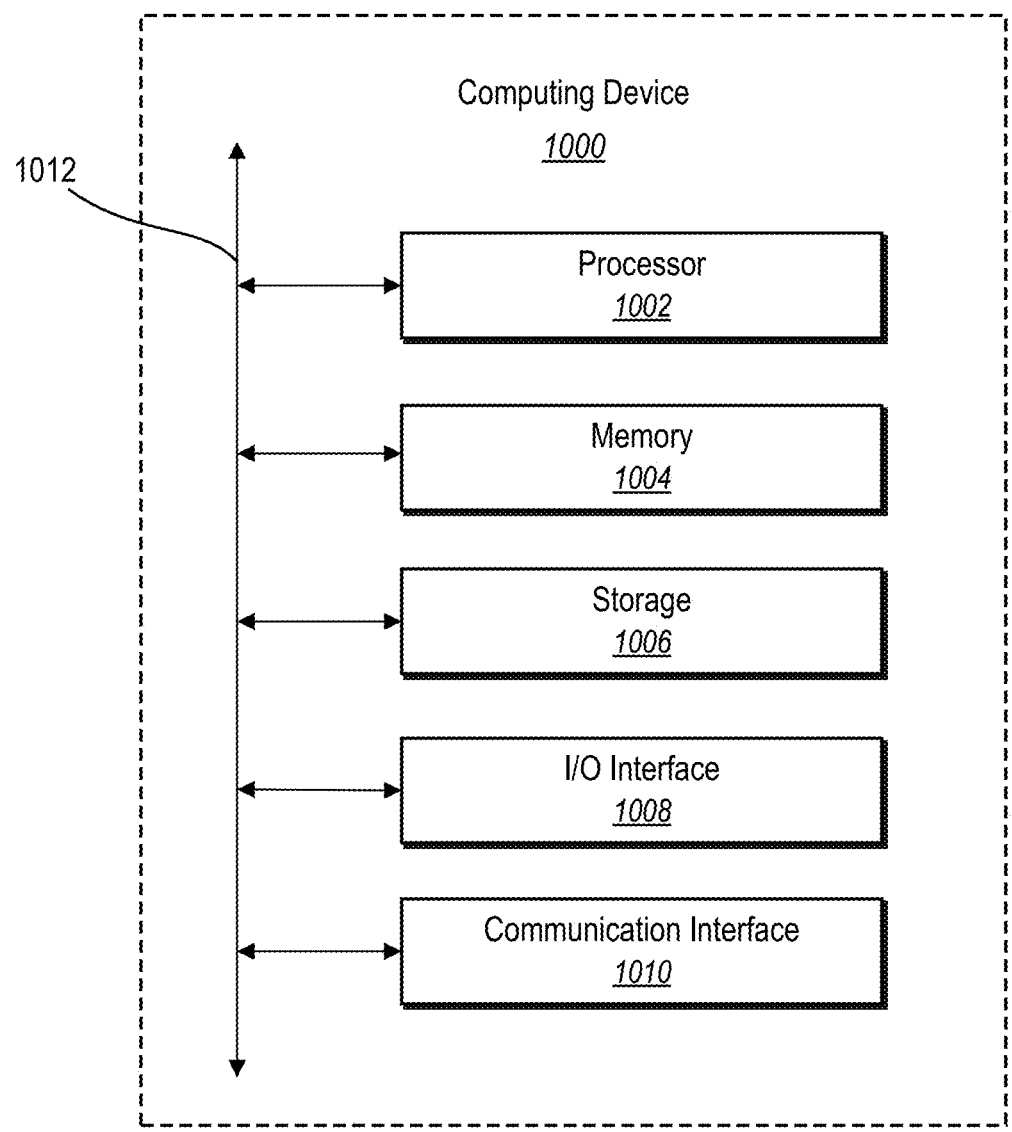
FIG. 10 illustrates a block diagram of an example computing device in accordance with one or more embodiments.

FIG. 10 illustrates, in block diagram form, an example computing device 1000 (e.g., the computing device 1300, the client device 110, and/or the server(s) 104) that may be configured to perform one or more of the processes described above. One will appreciate that the pixel-level prediction system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/ interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
    extract a first set of features from a digital image utilizing a first set of layers of a multi-exit pixel-level prediction neural network;
    generate a first pixel-wise classification prediction for the digital image from the first set of features utilizing a first early exit head of the multi-exit pixel-level prediction neural network;
    generate a masked feature map for the digital image by masking pixels from the first pixel-wise classification prediction that satisfy a confidence threshold;
    extract a second set of features from the masked feature map utilizing a second set of layers of the multi-exit pixel-level prediction neural network; and
    generate a second pixel-wise classification prediction for the digital image from the second set of features utilizing a second early exit head of the multi-exit pixel-level prediction neural network.

2. The non-transitory computer readable medium of claim 1, further comprising instructions that, when executed by the at least one processor, cause the computing device to:
    generate the first pixel-wise classification prediction by downsampling the first set of features by a first downsample measure utilizing the first early exit head; and
    generate the second pixel-wise classification prediction by downsampling the second set of features by a second downsample measure less than the first downsample measure utilizing the second early exit head.

3. The non-transitory computer readable medium of claim 2, further comprising instructions that, when executed by the at least one processor, cause the computing device to:
    generate the first pixel-wise classification prediction by generating a first pixel-wise spatial map indicating a first set of predicted values for pixels of the digital image utilizing the first early exit head, wherein the first early exit head comprises a first encoder-decoder structure; and
    generate the second pixel-wise classification prediction by generating a second pixel-wise spatial map indicating a second set of predicted values for pixels of the digital image utilizing the second early exit head, wherein the second early exit head comprises a second encoder-decoder structure.

4. The non-transitory computer readable medium of claim 3, further comprising instructions that, when executed by the at least one processor, cause the computing device to:
    generate the first pixel-wise classification prediction utilizing the first early exit head by utilizing a first number of convolution layers of the first encoder-decoder structure to downsample by the first downsample measure; and
    generate the second pixel-wise classification prediction utilizing the second early exit head by utilizing a second number of convolution layers of the second encoder-decoder structure to downsample by the second downsample measure.

5. The non-transitory computer readable medium of claim 1, further comprising instructions that, when executed by the at least one processor, cause the computing device to:
    determine confidence scores for predicted values within the first pixel-wise classification prediction; and
    generate a pixel mask by comparing the confidence scores for the predicted values of the first pixel-wise classification prediction to a pixel mask confidence threshold.

6. The non-transitory computer readable medium of claim 5, further comprising instructions that, when executed by the at least one processor, cause the computing device to:
    select a subset of pixels of the digital image utilizing the pixel mask; and
    generate the second pixel-wise classification prediction from the subset of pixels of the digital image utilizing the second early exit head.

7. The non-transitory computer readable medium of claim 6, further comprising instructions that, when executed by the at least one processor, cause the computing device to:

generate, utilizing the second early exit head, the second pixel-wise classification prediction from the subset of pixels of the digital image according to confidence scores for predicted values within the first pixel-wise classification prediction; and generate a third pixel-wise classification prediction by processing, utilizing a third early exit head, a different subset of pixels of the digital image according to different confidence scores for predicted values within the second pixel-wise classification prediction.

8. The non-transitory computer readable medium of claim 1, further comprising instructions that, when executed by the at least one processor, cause the computing device to extract the second set of features by:

interpolating pixels indicated by the masked feature map as satisfying the confidence threshold to generate an interpolated feature map from the first set of features extracted by the first set of layers of the multi-exit pixel-level prediction neural network; and extracting the second set of features from the interpolated feature map utilizing the second set of layers of the multi-exit pixel-level prediction neural network.

9. A system comprising:

one or more memory devices comprising a multi-exit pixel-level prediction neural network comprising a first set of layers, a first early exit head associated with the first set of layers, a second set of layers, and a second early exit head associated with the second set of layers;

one or more computing devices that are configured to cause the system to:

extract a first set of features from a digital image utilizing the first set of layers of the multi-exit pixel-level prediction neural network;

generate a first pixel-wise classification prediction for the digital image from the first set of features by downsampling the first set of features by a first downsample measure utilizing the first early exit head of the multi-exit pixel-level prediction neural network;

generate a masked feature map for the digital image by masking pixels from the first pixel-wise classification prediction that satisfy a confidence threshold;

extract a second set of features from the masked feature map utilizing the second set of layers of the multi-exit pixel-level prediction neural network; and generate a second pixel-wise classification prediction for the digital image from the second set of features by downsampling the second set of features by a second downsample measure less than the first downsample measure utilizing the second early exit head of the multi-exit pixel-level prediction neural network.

10. The system of claim 9, wherein the one or more computing devices are further configured to cause the system to:

generate the first pixel-wise classification prediction by generating a first pixel-wise spatial map indicating a first set of predicted values for pixels of the digital image utilizing the first early exit head, wherein the first early exit head comprises a first encoder-decoder structure; and generate the second pixel-wise classification prediction by generating a second pixel-wise spatial map indicating a second set of predicted values for pixels of the digital image utilizing the second early exit head, wherein the second early exit head comprises a second encoder-decoder structure.

11. The system of claim 10, wherein the one or more computing devices are further configured to cause the system to generate the first pixel-wise classification prediction by utilizing the first encoder-decoder structure comprising:

a first encoder including a first number of convolution layers for downsampling by the first downsample measure; and a first decoder including convolution layers for upsampling to an output resolution.

12. The system of claim 11, wherein the one or more computing devices are further configured to cause the system to generate the second pixel-wise classification prediction by utilizing the second encoder-decoder structure comprising:

a second encoder including a second number of convolution layers for downsampling by the second downsample measure; and a second decoder including convolution layers for upsampling to the output resolution.

13. The system of claim 9, wherein the one or more computing devices are further configured to cause the system to:

determine confidence scores indicating measures of confidence that predicted values within the first pixel-wise classification prediction are accurate;

compare the confidence scores for the predicted values within the first pixel-wise classification prediction to a confidence threshold; and generate the masked feature map indicating a first subset of pixels of the first pixel-wise classification prediction that satisfy the confidence threshold, and further indicating a second subset of pixels of the first pixel-wise classification prediction that fail to satisfy the confidence threshold.

14. The system of claim 13, wherein the one or more computing devices are further configured to cause the system to generate the second pixel-wise classification prediction by determining predicted values for the second subset of pixels utilizing the second early exit head.

15. The system of claim 9, wherein the one or more computing devices are further configured to cause the system to extract the second set of features from the digital image by:

generating, from the masked feature map, an interpolated feature map by interpolating a masked subset of features from the first set of features corresponding to the pixels with confidence scores that satisfy the confidence threshold; and generating the second set of features from the interpolated feature map utilizing the second set of layers.

16. A computer-implemented method for multi-exit pixel-level visual recognition, the computer-implemented method comprising:

generating a first pixel-wise spatial map for a digital image utilizing a first early exit head of a multi-exit pixel-level prediction neural network, the first pixel-wise spatial map comprising a first set of predicted classification values for pixels of the digital image;

determining confidence scores for the first set of predicted classification values within the first pixel-wise spatial map;

generating, from the confidence scores, a masked feature map by comparing the confidence scores with a pixel mask confidence threshold, wherein the masked feature map masks pixels from the first set of prediction classification values that satisfy a confidence threshold; and generating, from a subset of the pixels of the digital image selected using the masked feature map, a second pixel-wise spatial map for the digital image utilizing a second early exit head of the multi-exit pixel-level prediction neural network.

17. The computer-implemented method of claim 16, wherein generating the second pixel-wise spatial map comprises utilizing the second early exit head to process the subset of the pixels by determining predicted values from features corresponding to the subset of the pixels.

18. The computer-implemented method of claim 16, wherein generating the first pixel-wise spatial map comprises:
 extracting a first set of features from the digital image utilizing a first set of layers of the multi-exit pixel-level prediction neural network; and
 utilizing the first early exit head to downsample the first set of features by a first downsample measure.

19. The computer-implemented method of claim 18, wherein generating the second pixel-wise spatial map comprises:
 extracting a second set of features from the digital image utilizing a second set of layers of the multi-exit pixel-level prediction neural network; and
 utilizing the second early exit head to downsample the first set of features by a second downsample measure.

20. The computer-implemented method of claim 19, wherein generating the masked feature map comprises masking features of the digital image corresponding to predicted classification values within the first pixel-wise spatial map that satisfy the pixel mask confidence threshold.

\* \* \* \* \*